US012581355B2

(12) United States Patent
Zou et al.

(10) Patent No.: US 12,581,355 B2
(45) Date of Patent: Mar. 17, 2026

(54) SELECTIVELY ENABLING PDCP DUPLICATION FOR SURVIVAL TIME

(71) Applicant: Telefonaktiebolaget LM Ericsson (publ), Stockholm (SE)

(72) Inventors: Zhenhua Zou, Solna (SE); Torsten Dudda, Wassenberg (DE); John Walter Diachina, Garner, NC (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 245 days.

(21) Appl. No.: 18/288,716

(22) PCT Filed: Apr. 27, 2022

(86) PCT No.: PCT/EP2022/061278
§ 371 (c)(1),
(2) Date: Oct. 27, 2023

(87) PCT Pub. No.: WO2022/229294
PCT Pub. Date: Nov. 3, 2022

(65) Prior Publication Data
US 2024/0373283 A1 Nov. 7, 2024

Related U.S. Application Data

(60) Provisional application No. 63/180,821, filed on Apr. 28, 2021.

(51) Int. Cl.
*H04W 28/02* (2009.01)
*H04L 5/00* (2006.01)
(Continued)

(52) U.S. Cl.
CPC ......... *H04W 28/0273* (2013.01); *H04L 5/006* (2013.01); *H04L 5/0087* (2013.01);
(Continued)

(58) Field of Classification Search
CPC . H04W 28/0273; H04W 48/16; H04W 72/56; H04W 76/15; H04W 28/02;
(Continued)

(56) References Cited

U.S. PATENT DOCUMENTS 11,310,775 B2 * 4/2022 Babaei .................. H04L 1/1874
2019/0364137 A1 * 11/2019 Liu ...................... H04L 47/2441
(Continued)

FOREIGN PATENT DOCUMENTS

EP 3399724 A1 11/2018
WO 2019158059 A1 8/2019

OTHER PUBLICATIONS

3rd Generation Partnership Project, "3rd Generation Partnership Project; Technical Specification Group Services and System Aspects; Service requirements for cyber-physical control applications in vertical domains; Stage 1 (Release 18)", Technical Specification, 3GPP TS 22.104 V18.0.0, Mar. 2021, pp. 1-78, 3GPP, France.
(Continued)

*Primary Examiner* — Habte Mered
(74) *Attorney, Agent, or Firm* — COATS & BENNETT, PLLC

(57) ABSTRACT

At least one Packet Data Convergence Protocol (PDCP) packet duplication leg is configured with a logical channel prioritization (LCP) restriction, restricting a logical channel in the duplication leg to which transmission resources are intentionally not available. Stale packets, (not transmitted due to a lack of resources) are discarded, so the current packet is always at the top of the queue. PDCP duplication can then be activated quickly when needed, such as in survival time mode, as it has already been configured, and the current packet is always ready for transmission. The transmission resources can be dynamically allocated by the network by transmitting a DCI command (e.g., the Config-
(Continued)

ured Grant type 2 activation or dynamic grant with a specific PHY-priority-index). Alternatively, the transmission resource can be allocated beforehand, but scarcely, such that it occurs (i.e., is available) every N-th packet, and so there is a duplication for every N-th packet.

20 Claims, 15 Drawing Sheets

(51) Int. Cl.

| | |
|---|---|
| *H04L 69/22* | (2022.01) |
| *H04L 69/28* | (2022.01) |
| *H04W 48/16* | (2009.01) |
| *H04W 72/56* | (2023.01) |

(52) U.S. Cl.
CPC .............. *H04L 69/22* (2013.01); *H04L 69/28* (2013.01); *H04W 48/16* (2013.01); *H04W 72/56* (2023.01); *H04L 5/0091* (2013.01)

(58) Field of Classification Search
CPC ...... H04W 80/02; H04L 5/006; H04L 5/0087; H04L 69/22; H04L 69/28; H04L 5/0091; H04L 5/001; H04L 5/0023; H04L 5/0032; H04L 69/321; H04L 1/08; H04L 69/14; H04L 69/324
See application file for complete search history.

(56) References Cited

U.S. PATENT DOCUMENTS

| | | | |
|---|---|---|---|
| 2020/0274654 A1 | 8/2020 | Loehr et al. | |
| 2020/0314862 A1* | 10/2020 | Wu ................... | H04W 28/0268 |
| 2021/0014728 A1* | 1/2021 | Kuo ..................... | H04W 28/06 |
| 2023/0085168 A1* | 3/2023 | Chen ................ | H04W 28/0263 |
| | | | 370/235 |

OTHER PUBLICATIONS

3rd Generation Partnership Project, "3rd Generation Partnership Project; Technical Specification Group Services and System Aspects; System architecture for the 5G System (5GS); Stage 2 (Release 17)", Technical Specification, 3GPP TS 23.501 V17.0.0, Mar. 2021, pp. 1-436, 3GPP, France.
3rd Generation Partnership Project, "3rd Generation Partnership Project; Technical Specification Group Radio Access Network; NR; NR and NG-RAN Overall Description; Stage 2 (Release 16)", Technical Specification, 3GPP TS 38.300 V16.5.0, Mar. 2021, pp. 1-146, 3GPP, France.
Samsung, "Report of [POST116bis-e][512][IIoT] UP open issues", 3GPP TSG RAN WG2 Meeting #117-e, e-Meeting, Feb. 21-Mar. 3, 2022, pp. 1-21, R2-220xxxx, 3GPP.
Nokia et al., "Introduction of Rel-17 IIoT/URLLC to TS 38.300", Change request, 3GPP TSG-RAN WG2 Meeting #117 Electronic, Elbonia, 21 February - Mar. 3, 2022, pp. 1-15, R2-2203196, 3GPP.

* cited by examiner

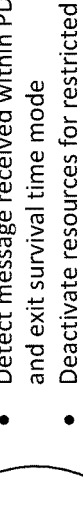
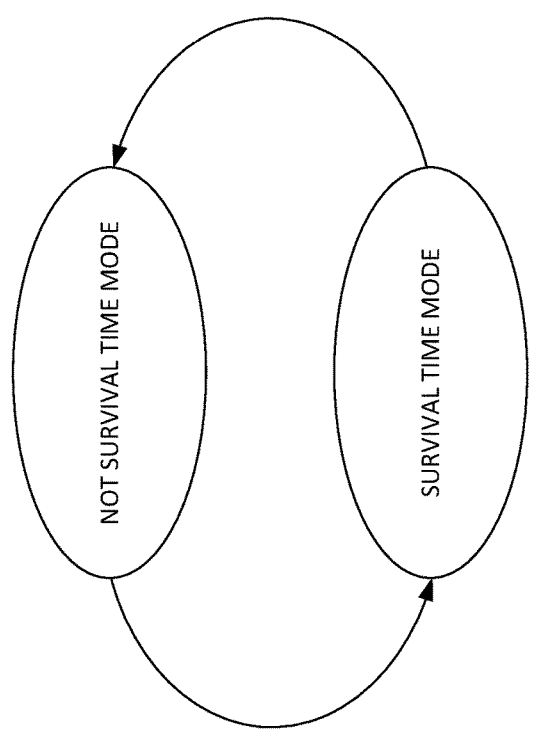

- Configure and activate PDCP duplication
- Configure discard timer for each duplication leg (e.g., >= PDB)
- Configure LCP restriction for at least one duplication leg such that transmission is limited to unavailable resources (e.g., configured but not activated CG)
- UE discards packets in restricted duplication leg so only the current one is ready to transmit

NOT SURVIVAL TIME MODE

SURVIVAL TIME MODE

- Detect message received within PDB and exit survival time mode
- Deactivate resources for restricted duplication leg(s) (e.g., deactivate CG).

- Activate radio resources for restricted duplication leg(s) (e.g., activate CG)
- UE transmits packets on restricted duplication leg

- Detect message not received within PDB and enter survival time mode

FIG. 2

BEGIN

1710
Host computer provides
user data

1720
Host computer initiates
transmission carrying the
user data to the UE

1730
UE receives the user data

END

SELECTIVELY ENABLING PDCP DUPLICATION FOR SURVIVAL TIME

TECHNICAL FIELD

The present disclosure relates generally to wireless communications and in particular to a system and method of configuring Packet Data Convergence Protocol packet duplication on unavailable resources and deleting un-transmitted packets, so the resources can be quickly allocated in a survival time mode.

BACKGROUND

The Fifth Generation (5G) New Radio (NR) standard under development by the Third Generation Partnership Project (3GPP) is being designed to provide service for multiple use cases, such as Enhanced Mobile Broadband (eMBB), Ultra-Reliable and Low Latency Communication (URLLC), and Machine-Type Communication (MTC). Each of these services has different technical requirements. For example, the general requirement for eMBB is high data rate with moderate latency and moderate coverage; URLLC service requires low latency and high reliability transmission with moderate data rates; and MTC tolerates low data rates, but requires high coverage and the ability to support massive numbers of devices.

One of the features to support these use cases is Packet Data Convergence Protocol (PDCP) packet duplication as specified in 3GPP Technical Standard (TS) 38.300 v16.5.0, § 16.1.3. For high reliability and low latency—such as required by URLLC services—the network can configure multiple independent transmission paths between two endpoints. Packet Data Units (PDUs) to be transmitted are duplicated, and a separate copy transmitted on each path. At the convergence point, the first PDU to arrive is forwarded, and duplicates are discarded. In this manner, a delay or loss on one path does not prevent the timely delivery of data.

In particular, when PDCP packet duplication is configured for a Data Radio Bearer (DRB), at least one secondary Radio Link Control (RLC) entity, in addition to the primary RLC entity, is added to the DRB to handle the duplicated PDCP PDUs. The logical channel (LCH) corresponding to the primary RLC entity is referred to as the primary LCH, and the LCH corresponding to a secondary RLC entity is referred to as a secondary LCH. A wireless device can be configured with multiple secondary RLC entities. When PDCP packet duplication is configured, the same PDCP PDUs are submitted multiple times—once to each activated RLC entity for the radio bearer. By providing multiple independent transmission paths, PDCP packet duplication increases reliability and reduces latency.

PDCP packet duplication is possible in Dual Connectivity (DC) and Carrier Aggregation (CA) protocol architectures. Both Radio Resource Control (RRC) signaling and Medium Access Control (MAC) Control Elements (CEs) can be used to control activation/deactivation of packet duplication by the UE in uplink (UL) by the base station (gNB).

In the 5G Quality of Service (QoS) framework, a QoS flow is established in the 5G system and can be mapped to a DRB. The QoS flow is associated with QoS parameters (5G QoS Identifier (5QI) values) such as Packet Delay Budget (PDB). The 5G Radio Access Network (RAN) scheduling packets of this QoS flow (mapped to a DRB in 5G RAN) shall thus deliver packets within this PDB.

Another metric important in the URLLC communication context, related to PDB, is so-called "survival time."

According to 3GPP TS 22.104 v18.0.0, survival time is defined as the time that an application consuming a communication service may continue without an anticipated message. The message is expected to be received by the application no later than at the end of the PDB, and the survival time is the maximum additional time that a message is expected after the PDB expires.

For Time Sensitive Communication (TSC) traffic types (typical in industrial automation, autonomous vehicles, and other URLLC type communications), 3GPP TS 23.501 v17.0.0 specifies TSC Assistance Information (TSCAI) signaling, which provides further information on the QoS flow traffic from the 5G core network to a RAN. This signaling includes information on UL/DL direction, periodicity, arrival time of a burst of data in this flow, and the survival time. See table 5.27.2-1 in the 3GPP TS 23.501 v17.0.0, reproduced below:

TABLE 5.27.2-1

| TSC Assistance Information (TSCAI | |
| --- | --- |
| Assistance Information | Description |
| Flow Direction | The direction of the TSC flow (uplink or downlink). |
| Periodicity | It refers to the time period between start of two bursts. |
| Burst Arrival time (Optional) | The latest possible time when the first packet the data burst arrives at either of the ingress of the RAN (downlinkflow direction) or egress interface of the UE (uplink flow direction). |
| Survival Time (Optional) | It refers to the time period an application can survive without any burst, as defined in clause C.2.3 of TS 22.104. |

The survival time is typically expressed as an integer number of periodicities of the incoming traffic. Knowledge of the survival time can be beneficial for a gNB to opportunistically schedule a least an amount of radio resources to meet the QoS requirement of the traffic.

FIG. 1 depicts such an additional allocation of radio resources to meet QoS for a known survival time. The network schedules radio resources with normal allocation of Physical Resource Blocks (PRB) for the incoming packets with a nominal Packet Error Rate (PER) target. If a packet is not delivered within the Packet Delay Budget (PDB), causing the application to enter survival time mode, more radio resources are allocated for subsequent packets so that those packets are delivered within the survival time. In the example of FIG. 1, assume the first message is lost and not delivered to the application (as indicated by the dashed lines). This starts the survival time. The gNB allocates additional resources, and the second message is delivered on time—that is, within the PDB. After successfully receiving one packet within the survival time, the application exits survival time mode, and resource allocations can return to the normal case, e.g., for delivery of the third message.

The network can transmit a dynamic re-scheduling commands (e.g., dynamic UL grant or DL assignments) to allocate more resources for the subsequent packets. The dynamic re-scheduling commands can only schedule transmission resources for subsequent packets on the same cell as the initial transmission. In the case of re-allocating the resources for the UL configured grant (CG) and DL Semi-Persistent Scheduling (SPS), it is restricted in the cell in which CG and SPS are configured. These restrictions can be insufficient to deliver the subsequent packets within the survival time if this cell may be subject to blocking (e.g., in FR2).

PDCP duplication on another cell is known to provide diversity gain and boost the packet transmission reliability. However, PDCP duplication is activated only by the MAC CE or the RRC configuration, both of which are slow and not suitable for the case in which the survival time is short (e.g., 0.5 millisecond).

The Background section of this document is provided to place aspects of the present disclosure in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of aspects of the disclosure or to delineate the scope of the disclosure. The sole purpose of this summary is to present some concepts disclosed herein in a simplified form as a prelude to the more detailed description that is presented later.

According to aspects of the present disclosure disclosed and claimed herein, fast activation of PDCP duplication resources is enabled by deliberately scheduling at least one duplication leg for which transmission resources are not available. Stale packets, (not transmitted due to a lack of resources) are discarded, so the current packet is always at the top of the queue. That PDCP duplication leg can then be activated quickly when needed, as it has already been configured.

In particular, the network configures and (proactively) activates PDCP duplication with several duplication legs. For at least one PDCP duplication leg, the network configures a logical channel prioritization (LCP) restriction, so that the logical channel in that duplication leg is restricted to be transmitted on resources that are not always available for the UE to utilize. The network configures a discard timer so that the old/stale packets are discarded, meaning those packets for which a PDCP duplication is activated, but no transmission resources were available. As a result, when resources are made available by the network, only the latest PDCP duplicate packet from the UE will be transmitted.

There are two variants for the resource allocation by the network. First, the resource is not activated beforehand, and, if entering the survival time, the network dynamically can transmit a DCI command (e.g., the CG type 2 activation or dynamic grant with a specific PHY-priority-index) to allocate these resources for the UE to actually transmit data packets on the configured PDCP duplication leg. Second, the resource is activated beforehand, but scarcely, such that it occurs (i.e., is available) every N-th packet, and so there is a duplication for every N-th packet.

One aspect relates to a method, performed by a wireless device operative in a wireless communication network, for transmitting uplink data packets in a data flow implementing Packet Data Convergence Protocol (PDCP) packet duplication. A first Radio Link Control (RLC) entity is operated as a first PDCP duplication leg, and a second RLC entity is operated as a second PDCP duplication leg. Upon the actual or estimated arrival of each data packet in the first PDCP duplication leg, a discard timer having a duration less than an estimated arrival time of a subsequent data packet is started. In response to the unavailability of radio resources associated with the first PDCP duplication leg, each packet is discarded, without transmitting it, at the expiration of the discard timer. In response to the network allocating radio resources associated with the first PDCP duplication leg, data packets are transmitted to the network utilizing the allocated radio resources.

Another aspect relates to a method, performed by a base station operative in a wireless communication network, for controlling the transmission of uplink data packets in a data flow implementing Packet Data Convergence Protocol (PDCP) packet duplication. A first Radio Link Control (RLC) entity is configured as a first PDCP duplication leg in a wireless device operative in the wireless communication network. A second RLC entity is configured as a second PDCP duplication leg in the wireless device. A discard timer in the wireless device is configured to be started upon the actual or estimated arrival of each data packet in the first PDCP duplication leg, the discard timer having a duration less than an estimated arrival time of a subsequent data packet. In response to timely receiving data packets from the second PDCP duplication leg, radio resources associated with the first PDCP duplication leg are not allocated. In response to failing to timely receive a data packet from the second PDCP duplication leg, radio resources associated with the first PDCP duplication leg are allocated and data packets from the first PDCP duplication leg are received.

Yet another aspect relates to a UE operative in a wireless communication network to transmit uplink data packets in a data flow implementing Packet Data Convergence Protocol (PDCP) packet duplication. The UE includes communication circuitry configured to wirelessly transmit and receive signals, and processing circuitry operatively connected to the communication circuitry. The processing circuitry is configured to operate a first Radio Link Control (RLC) entity as a first PDCP duplication leg, and a second RLC entity as a second PDCP duplication leg; upon the actual or estimated arrival of each data packet in the first PDCP duplication leg, start a discard timer having a duration less than an estimated arrival time of a subsequent data packet; in response to the unavailability of radio resources associated with the first PDCP duplication leg, discard each packet, without transmitting it, at the expiration of the discard timer; and in response to the network allocating radio resources associated with the first PDCP duplication leg, transmit data packets to the network utilizing the allocated radio resources.

Still another aspect relates to a base station operative in a wireless communication network to control the transmission of uplink data packets in a data flow implementing Packet Data Convergence Protocol (PDCP) packet duplication. The base station includes communication circuitry configured to wirelessly transmit and receive signals, and processing circuitry operatively connected to the communication circuitry. The processing circuitry is configured to configure a first Radio Link Control (RLC) entity as a first PDCP duplication leg in a wireless device operative in the wireless communication network and a second RLC entity as a second PDCP duplication leg in the wireless device; configure a discard timer in the wireless device to be started upon the actual or estimated arrival of each data packet in the first PDCP duplication leg, the discard timer having a duration less than an estimated arrival time of a subsequent data packet; in response to timely receiving data packets from the second PDCP duplication leg, not allocate radio resources associated with the first PDCP duplication leg; and in response to failing to timely receive a data packet from the second PDCP duplication leg, allocate radio resources associated with the first PDCP duplication leg.

BRIEF DESCRIPTION OF THE DRAWINGS

The present disclosure will now be described more fully hereinafter with reference to the accompanying drawings, in which aspects of the disclosure are shown. However, this disclosure should not be construed as limited to the aspects set forth herein. Rather, these aspects are provided so that this disclosure will be thorough and complete, and will fully convey the scope of the disclosure to those skilled in the art. Like numbers refer to like elements throughout.

FIG. 2 is a state diagram showing transitions into and out of survival mode.

DETAILED DESCRIPTION

Figure 1:
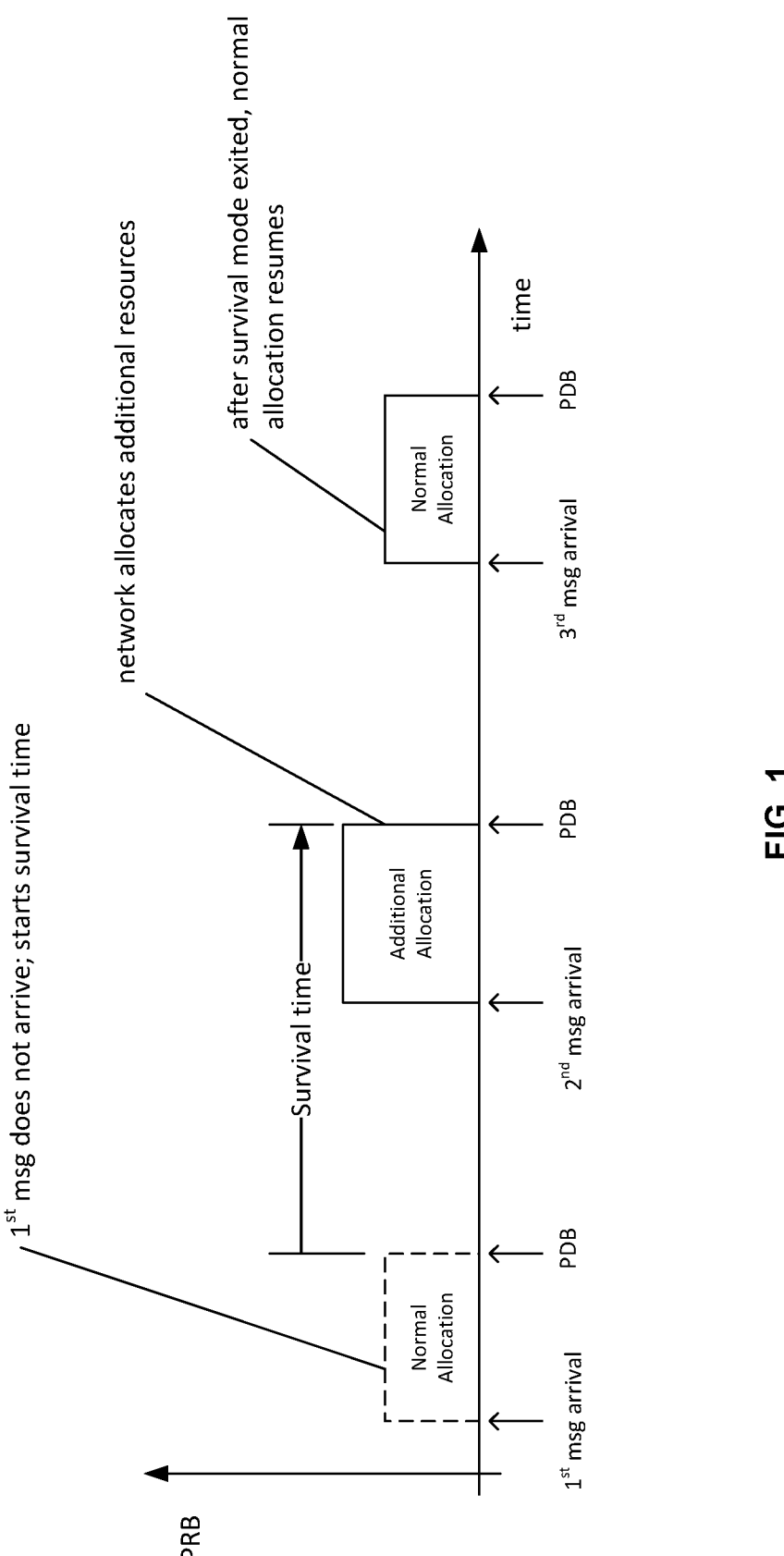
FIG. 1 is a timing diagram illustrating the dynamic allocation of resources when survival mode is activated.

For simplicity and illustrative purposes, the present disclosure is described by referring mainly to one or more exemplary aspects thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

In the following discussion, for simplicity and without loss of generality, it is assumed that there is a single packet within one burst period of a TSN QoS flow, and it is mapped to one PDCP Service Data Unit (SDU).

According to aspects disclosed herein, the network configures and activates at least first and second PDCP duplication legs for a Data Radio Bearer (DRB), and configures a discard timer equal to the packet delay budget (PDB) of the DRB. In one aspect, the discard timer may be a PDCP discard timer; in another aspect, the discard timer may be a RLC discard timer associated with a PDCP duplication leg.

The purpose of the discard timer is to allow the transmitter to discard the packet that has been delayed more than the PDB—in other words, the packet that would not meet its PDB. In one aspect, the discarding mechanism applies only to a first PDCP duplication leg, for which intentional lack of resources is expected. This way, in the case that no resources are allocated for the first PDCP duplication leg, packets are quickly discarded. On the other hand, packets still have the chance to be transmitted eventually via a different PDCP duplication leg, e.g., a second PDCP duplication leg, which does not discard packets as quickly. According to current specifications, PDCP discard is indicated to all duplication legs (RLC entities) for discarding packets already transmitted to these RLC entities. According to aspects of the present disclosure, however, the discarding indication is only provided to certain RLC entities, and is not provided to other RLC entities.

From the Burst Arrival Time (BAT) parameter in the TSCAI, an arrival time jitter for the packet can be determined, and the BAT captures the latest possible time when the packet arrives at the RAN or UE. In other words, the packet may arrive at any time before the BAT. It is understood that the above discard timers in the 3GPP standards start at the actual packet arrival time at the relevant protocol layers (e.g., PDCP discard timers at the PDCP layer, and RLC discard timers at the RLC layer). When considering the uplink case, the survival time at the network may start at the end of the BAT plus the PDB, and therefore does not consider the actual packet arrival time at the UE. Aspects disclosed herein take into account these differences between the RAN and UE regarding actual packet arrival time, and may only work in the case that the PDB is shorter than the packet periodicity.

In one aspect, the start of the discard timer is aligned with the actual packet arrival time at the PDCP/RLC layer of the UE/gNB. The value of the discard timer is set longer than the PDB; the principle is to set the discard timer to account for the packet arrival jitter. This ensures that the packet is not unnecessarily discarded, and does not interfere with transmission of the packet in the next period. For example, the discard timer can be set to the time difference between BAT (the latest possible time when a packet can arrive within the current period) and the earliest possible time the next packet can arrive within the next period.

In another aspect, the start of the discard timer is aligned with the BAT in the TSCAI parameter, not the actual packet arrival time at the PDCP/RLC layer of the UE/gNB. This is achieved by specifying that the UE shall start the discard timer when the PDCP/RLC packet is delivered to the lower layer for transmission. The network shall configure periodic resources (for transmission of the first duplicate or original), where at least one periodic resource occurs at time BAT and the remaining resources occur periodically according to the periodicity parameter in the TSCAI.

As one option, for the case where the discard timer is started periodically at BAT, the BAT and periodicity are indicated from the network to the UE.

In some aspects, PDCP duplication is enabled by DCI command.

In these aspects, the network additionally configures Logical Channel Prioritization (LCP) restrictions so that some LCHs for PDCP duplication (i.e., duplication legs) are restricted to being transmitted using a specific set of resources. When resources for any given duplication leg are not available to the UE, the RLC packets ready for transmission thereon are not transmitted, and are discarded after PDB per the discard timer configurations.

One example of such an LCP restriction is that the LCH is restricted to only being transmitted on a configured CG, but the CG is not active.

Another example is that the LCH is restricted to only being transmitted on a dynamic grant with priority index p1 (i.e., a higher PHY priority index grant intended for URLLC service), but the network does not transmit the dynamic grant with priority index p1.

When a survival time mode is entered (e.g., the network does not receive a packet at the expected time instance for UL periodic traffic, e.g., from a PDCP duplication leg that has network resources allocated to it), then the network transmits DCI commands to enable data packet transmission on configured PDCP duplication legs which have not been allocated resources. For the first example above, a CG activation DCI command is issued to activate the CGs that were not activated. For the second example above, the network issues a dynamic grant with priority index p1. This allows the PDCP duplication to be enabled for those duplication legs. Since the previous packets were discarded after the PDB timer expired, they do not block the transmission of the subsequent packets.

When the survival time mode is exited (e.g., the network receives a packet at the expected time instance for UL periodic traffic), then the network may transmit a CG de-activation DCI command to de-activate some activated CGs, or stop transmitting the dynamic grant with priority index p1. This allows the PDCP duplication not to be used, thereby preserving the radio resources. The de-activation by DCI also allows a faster activation by DCI in a later valid survival time mode. Additionally, the network can independently choose to de-activate CGs, i.e., the de-activated CGs do not necessarily need to be the ones that were activated in the previous survival time mode. This allows the network to recover the links on the cells that were failed in the first place (e.g., beam failure recovery).

Without loss of generality, an example of a PDCP duplication with two legs is presented below. This can be extended to a PDCP duplication with more than two legs, in which the method can be applied to any subset of PDCP duplication legs.

Configuration by the network:

gNB activates PDCP duplications with LCH-a and LCH-b

RLC discard time for LCH-a and LCH-b is equal to PDB

LCP restriction configures LCH-a in Cell-A (by allowed-ServingCells).

LCP restriction configures LCH-b in Cell-B (by allowed-ServingCells).

LCP restriction configures LCH-b restricted in CG-b configured in Cell-B (by allowedCG-List-r16)

The CG-b is configured but de-activated

Actions upon UE entering survival time:

gNB transmits the CG-b activation DCI command

Actions upon UE exiting survival time:

gNB transmits the CG-b de-activation DCI command

In some aspects, PDCP duplication is pro-actively enabled every N-th PDCP SDUs.

In these aspects, the network additionally configures Logical Channel Prioritization (LCP) restrictions so that some LCHs for PDCP duplication are restricted to be transmitted only on resources that are configured to be available only every N-th PDCP SDU. By this configuration, the RLC packets on these duplication legs are not transmitted and are discarded after PDB per the discard timer configurations if no resources are provided and, as a result, the PDCP duplication is enabled only every N-th time (i.e., a duplicate is only transmitted for every N-th PDCP SDU).

One example of such an LCP restriction is that the LCH is restricted to be transmitted on a configured and activated CG whose periodicity is N* the periodicity of the traffic.

Another example is that the LCH is restricted to be transmitted on a dynamic grant with priority index p1 (i.e., a higher PHY priority index grant intended for URLLC service), and the network transmit such a dynamic grant periodically, wherein the periodicity is equal N* the periodicity of the traffic.

FIG. 2 depicts a state diagram of a network (e.g., the RAN) transitioning into and out of survival time mode, and the network actions taken in each state and at the transitions. When the network is not in survival time mode—that is, periodic packets in a TSC QoS flow are received within their PDBs—the network configures and activates PDCP duplication. The network configures a discard timer for each duplication leg. For at least one duplication leg, the discard timer is at least equal to the PDB, and is less than the arrival time of a next packet (e.g., determined from the periodicity parameter in a TSCAI). The network configures an LCP restriction for a logical channel in at least one duplication leg, such that transmission is limited to radio resources that are currently intentionally unavailable—e.g., dependent on a configured but not activated CG. Throughout the time the network is not in survival time mode, in response to the discard timer and the unavailability of specified radio resources, the UE receives and discards packets in the restricted PDCP duplication leg, such that no packets are transmitted from that duplication leg, and only a current packet is ready to transmit from that duplication leg at any time.

Upon detecting a message not received within the PDB, the network enters survival time mode. In survival time mode, the network activates the radio resources for the restricted PDCP duplication leg—e.g., activating the configured but heretofore non-activated CG. In response to the CG, the UE transmits packets on the restricted PDCP duplication leg. The packets are current because prior packets were discarded at or after the expiration of their PDB. The addition of radio resources (i.e., activation of the restricted PDCP duplication leg) to address the survival time situation is very fast—i.e., transmitting a CG in a DCI—particularly as compared to an RRC message or a MAC CE.

When the network detects a message received within the PDB, it exits survival time mode. The network deactivates radio resources for the restricted PDCP duplication leg—e.g., de-activating the configured CG. In response, the UE ceases transmitting packets in the restricted PDCP duplication leg, but continues transmitting packets in non-restricted PDCP duplication leg(s). The UE discards packets in the restricted PDCP duplication leg without transmitting them, so that only a current packet is ready to transmit at any time.

Figure 3:
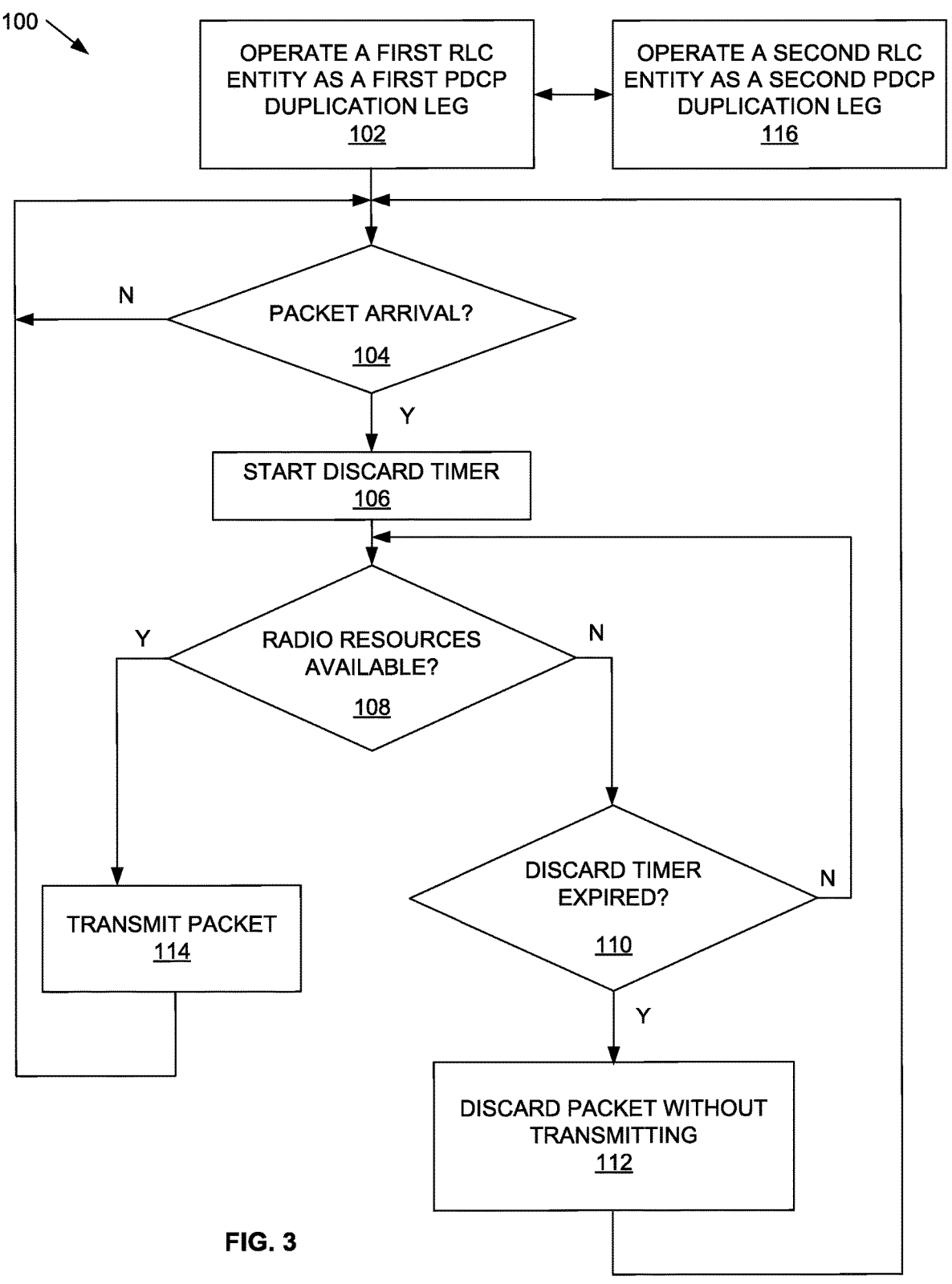
FIG. 3 is a flow diagram of a method of transmitting uplink data packets in a data flow implementing PDCP packet duplication.

FIG. 3 depicts a method 100 in accordance with particular aspects. The method 100 is performed by a wireless device operative in a wireless communication network. The method 100 is a method of transmitting uplink data packets in a data flow implementing Packet Data Convergence Protocol (PDCP) packet duplication. A first Radio Link Control (RLC) entity is operated as a first PDCP duplication leg (block 102), and a second RLC entity is operated as a second PDCP duplication leg (block 116). Upon the actual or estimated arrival of each data packet in the first PDCP duplication leg (block 104), a discard timer, having a duration less than an estimated arrival time of a subsequent data packet, is started (block 106). In response to the unavailability of radio resources associated with the first PDCP duplication leg (block 108), upon the expiration of the discard timer (block 110) each packet is discarded, without transmitting it (block 112). In response to the network allocating radio resources associated with the first PDCP duplication leg (block 108), data packets are transmitted to the network utilizing the allocated radio resources (block 114).

Figure 4:
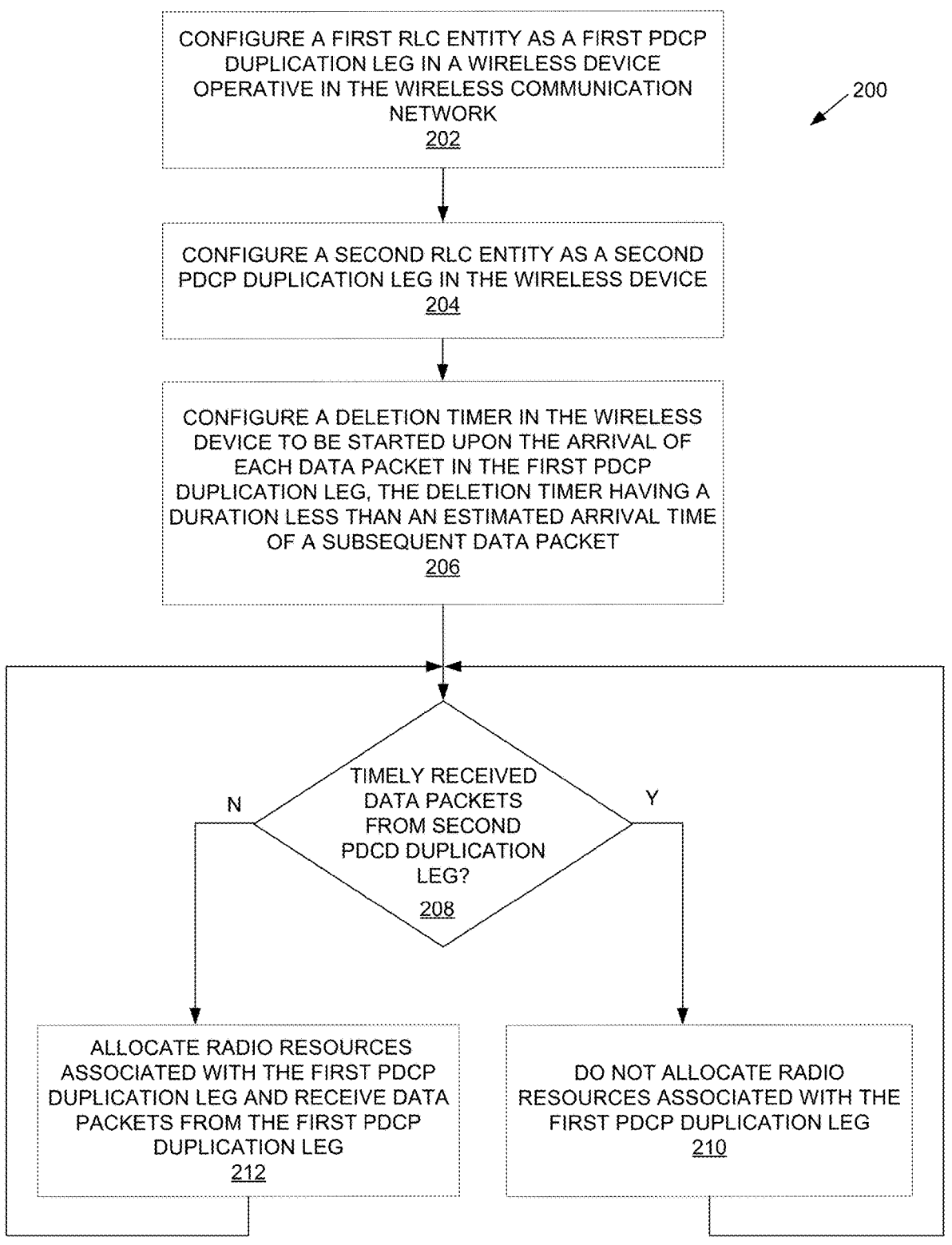
FIG. 4 is a flow diagram of a method of controlling the transmission of uplink data packets in a data flow implementing PDCP packet duplication.

FIG. 4 depicts a method 200 in accordance with other particular aspects. The method 200 is performed by a base station operative in a wireless communication network. The method 200 is a method of controlling the transmission of uplink data packets in a data flow implementing Packet Data Convergence Protocol (PDCP) packet duplication. A first Radio Link Control (RLC) entity is configured as a first PDCP duplication leg in a wireless device operative in the wireless communication network (block 202), and a second RLC entity is configured as a second PDCP duplication leg in the wireless device (block 204). A discard timer is configured in the wireless device to be started upon the actual or estimated arrival of each data packet in the first PDCP duplication leg (block 206). The discard timer has a duration less than an estimated arrival time of a subsequent data packet. In response to timely receiving data packets from the second PDCP duplication leg (block 208), radio resources associated with the first PDCP duplication leg are not allocated (block 210). In response to failing to timely receive a data packet from the second PDCP duplication leg (block 208), radio resources associated with the first PDCP duplication leg are allocated, and data packets from the first PDCP duplication leg are received (block 212).

Note that apparatuses described herein may perform the methods 100, 200 herein and any other processing by implementing any functional means, modules, units, or circuitry. In one aspect, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several aspects. In aspects that employ memory, the memory stores program code that, when executed by the one or more processors, carries out the techniques described herein.

Figure 5:
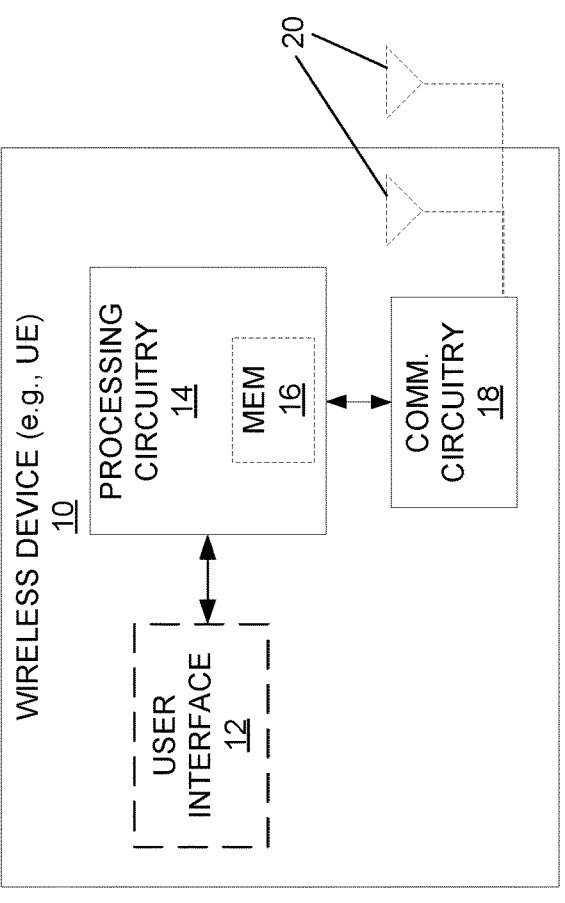
FIG. 5 is a hardware block diagram of a wireless device.

FIG. 5 for example illustrates a hardware block diagram of a wireless device 10 as implemented in accordance with one or more aspects. A wireless device 10 is any type of device capable of communicating with a network node and/or access point using radio signals. A wireless device 10 may therefore refer to a machine-to-machine (M2M) device, a machine-type communications (MTC) device, a Narrowband Internet of Things (NB IoT) device, etc. The wireless device 10 may also be referred to as a User Equipment (UE), such as a cellular telephone or "smartphone," however, the term UE should be understood to encompass any wireless device 10. A wireless device 10 may also be referred to as a radio device, a radio communication device, a wireless device, a wireless terminal, or simply a terminal-unless the context indicates otherwise, the use of any of these terms is intended to include device-to-device UEs or devices, machine-type devices, or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices, although referred to as UEs, but may be configured to transmit and/or receive data without direct human interaction.

In some aspects, the wireless device 10 includes a user interface 12 (display, touchscreen, keyboard or keypad, microphone, speaker, and the like); in other aspects, such as in many M2M, MTC, or NB IoT scenarios, the wireless device 10 may include only a minimal, or no, user interface 12 (as indicated by the dashed lines of block 12 in FIG. 4). The wireless device 10 also includes processing circuitry 14; memory 16; and communication circuitry 18 connected to one or more antennas 20, to effect wireless communication across an air interface to one or more radio network nodes, such as a base station, and/or access points. As indicated by the dashed lines, the antenna(s) 20 may protrude externally from the wireless device 10, or the antenna(s) 20 may be internal. In some aspects, a wireless device 10 may include a sophisticated user interface 12, and may additionally include features such as a camera, accelerometer, satellite navigation signal receiver circuitry, vibrating motor, and the like (not depicted in FIG. 5).

According to aspects of the present disclosure, the memory 16 is operative to store, and the processing circuitry 14 operative to execute, software which when executed is operative to cause the wireless device 10 to transmit packets for a TCS QoS flow from a first PDCP duplication leg using restricted radio resources when the network is in survival time mode. In particular, the software, when executed on the processing circuitry 14, is operative to perform the method 100 described and claimed herein. The processing circuitry 14 in this regard may implement certain functional means, units, or modules.

Figure 6:
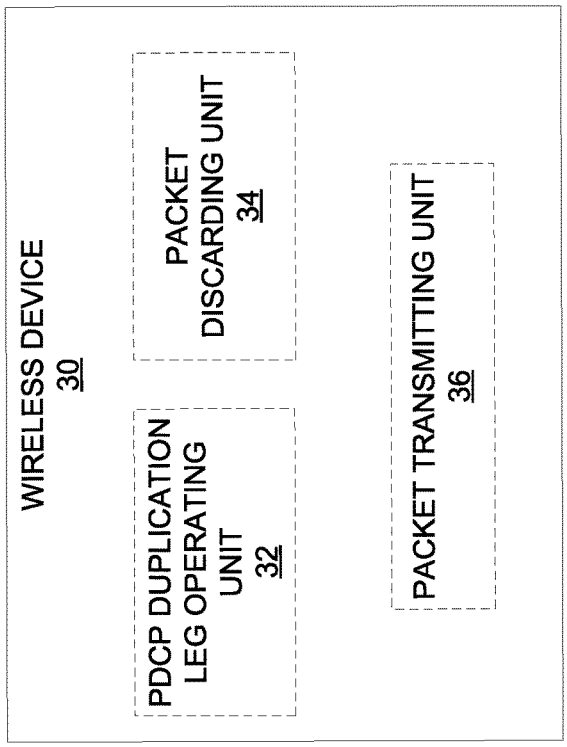
FIG. 6 is a functional block diagram of a wireless device.

FIG. 6 illustrates a functional block diagram of a wireless device 30 in a wireless network according to still other aspects. As shown, the wireless device 30 implements various functional means, units, or modules, e.g., via the processing circuitry 14 in FIG. 5 and/or via software code. These functional means, units, or modules, e.g., for implementing the method(s) herein, include for instance: a PDCP duplication leg operating unit 32, a packet discarding unit 34, and a packet transmitting unit 36.

The network PDCP duplication leg operating unit 32 is configured to operate a first Radio Link Control (RLC) entity as a first PDCP duplication leg, and a second RLP entity as a second PDCP duplication leg. The packet discarding unit 34 is configured to, upon the actual or estimated arrival of each data packet in the first PDCP duplication leg, start a discard timer having a duration less than an estimated arrival time of a subsequent data packet, and in response to the unavailability of radio resources associated with the first PDCP duplication leg, discard each packet, without transmitting it, at the expiration of the discard timer. The packet transmitting unit 36 is configured to, in response to the network allocating radio resources associated with the first PDCP duplication leg, transmit data packets to the network utilizing the allocated radio resources.

Figure 7:
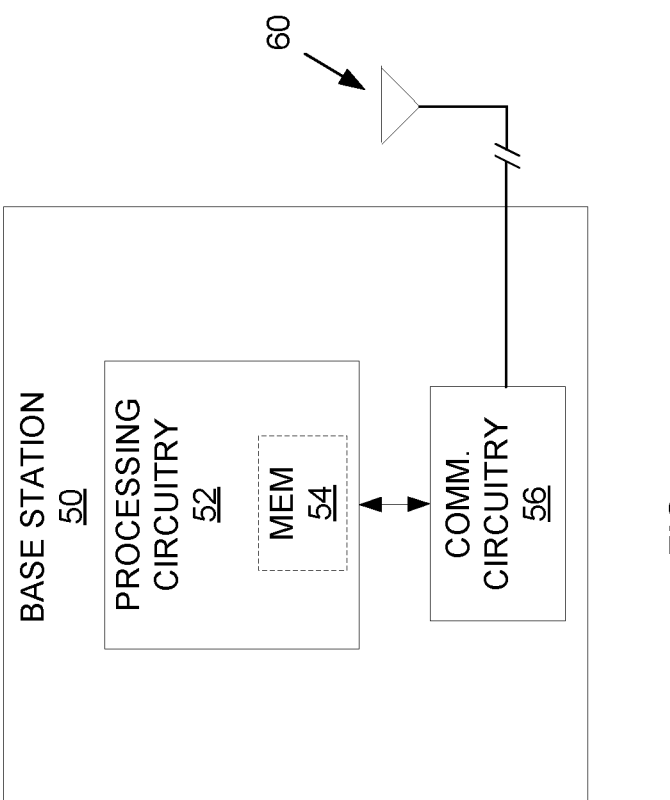
FIG. 7 is a hardware block diagram of a base station.

FIG. 7 depicts a hardware block diagram of a base station 50 operative in a wireless communication network. The base station 50 includes processing circuitry 52; memory 54; and communication circuitry 56 connected to one or more antennas 60, to effect wireless communication across an air interface to one or more wireless devices 10. As indicated by the broken connection to the antenna(s) 60, the antenna(s) 60 may be physically located separately from the base station 50, such as mounted on a tower, building, or the like. Although the memory 56 is depicted as being internal to the processing circuitry 54, those of skill in the art understand that the memory 56 may also be external. Those of skill in the art additionally understand that virtualization techniques allow some functions nominally executed by the processing circuitry 54 to actually be executed by other hardware, perhaps remotely located (e.g., in the so-called "cloud"). The base station 50 is known in LTE as an eNodeB or eNB, and in New Radio (NR) as gNB. In general, in other wireless communication networks, the base station 50 may be known as a Radio Base Station, Base Transceiver Station, Access Point, or the like.

According to one aspect of the present disclosure, the processing circuitry 54 is operative to cause the base station 50 to enter survival time mode upon detecting a missed packet in a TCS QoS flow, and in response to allocate additional radio resources to the TCS QoS flow until a packet is received within a Packet Delay Budget (PDB). In particular, the processing circuitry 54 is operative to perform the method 200 described and claimed herein. The processing circuitry 54 in this regard may implement certain functional means, units, or modules.

Figure 8:
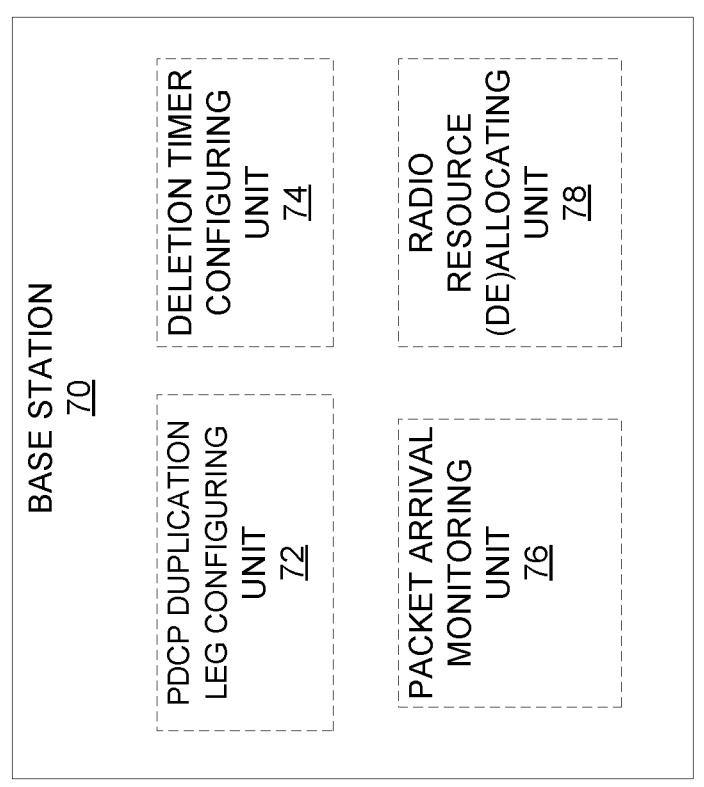
FIG. 8 is a functional block diagram of a base station.

FIG. 8 illustrates a functional block diagram of a base station 70 in a wireless network according to still other aspects. As shown, the base station 72 implements various functional means, units, or modules, e.g., via the processing circuitry 52 in FIG. 6 and/or via software code. These functional means, units, or modules, e.g., for implementing the method 200 herein, include for instance: PDCP duplication leg configuring unit 72, discard timer configuring unit 74, packet arrival monitoring unit 76, and radio resource (de)allocating unit 78.

The PDCP duplication leg configuring unit 72 is configured to configure a first Radio Link Control (RLC) entity as a first PDCP duplication leg in a wireless device operative in the wireless communication network, and to configure a second RLC entity as a second PDCP duplication leg in the wireless device. The discard timer configuring unit 74 is configured to configure a discard timer in the wireless device to be started upon the actual or estimated arrival of each data packet in the first PDCP duplication leg, the discard timer having a duration less than an estimated arrival time of a subsequent data packet. The packet arrival monitoring unit 76 is configured to monitor the arrival of packets from the first and second PDCP duplication legs. The radio resource (de) allocating unit 78 is configured to, in response to timely receiving data packets from the second PDCP duplication leg, not allocate radio resources associated with the first PDCP duplication leg; and in response to not timely receiving data packets from the second PDCP duplication leg, allocate radio resources associated with the first PDCP duplication leg and receive data packets from the first PDCP duplication leg.

Those skilled in the art will also appreciate that aspects herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Aspects further include a carrier containing such a computer program. This carrier may comprise one of an electronic signal, optical signal, radio signal, or computer readable storage medium.

In this regard, aspects herein also include a computer program product stored on a non-transitory computer readable (storage or recording) medium and comprising instructions that, when executed by a processor of an apparatus, cause the apparatus to perform as described above.

Aspects further include a computer program product comprising program code portions for performing the steps of any of the aspects herein when the computer program product is executed by a computing device. This computer program product may be stored on a computer readable recording medium.

Network Description and Over the Top Aspects

Figure 9:
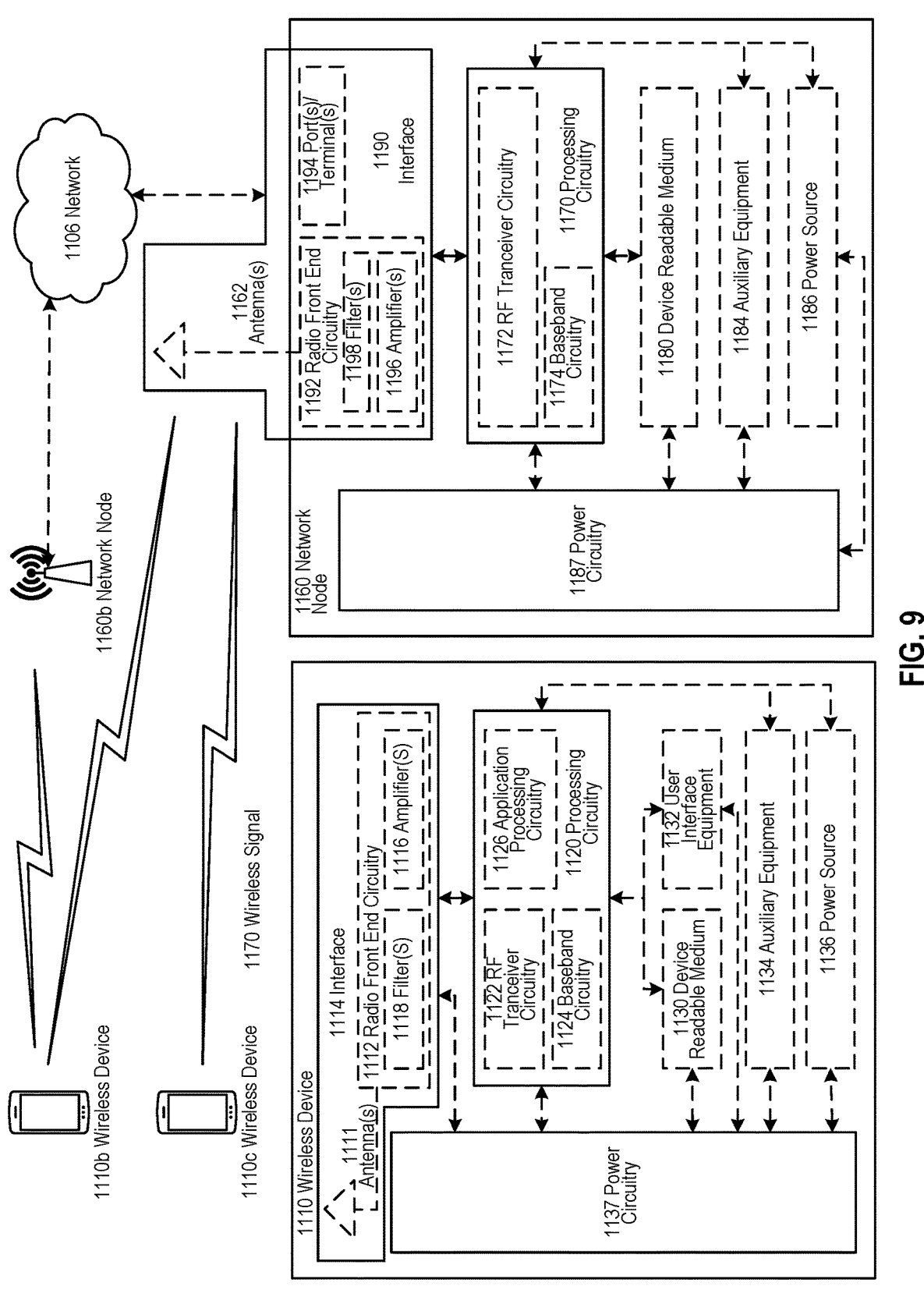
FIG. 9 is a block diagram of a wireless communication network and some components thereof.

Although the subject matter described herein may be implemented in any appropriate type of system using any suitable components, the aspects disclosed herein are described in relation to a wireless network, such as the example wireless network illustrated in FIG. 9. For simplicity, the wireless network of FIG. 9 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some aspects, the wireless network may be configured to operate according to specific standards or other types of predefined rules or procedures. Thus, particular aspects of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different aspects, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 9 may represent a device that includes the illustrated combination of hardware components, other aspects may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some aspects, network node 1160 may be configured to support multiple radio access technologies (RATs). In such aspects, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some aspects, processing circuitry 1170 may include a system on a chip (SOC).

In some aspects, processing circuitry 1170 may include one or more of radio frequency (RF) transceiver circuitry 1172 and baseband processing circuitry 1174. In some aspects, radio frequency (RF) transceiver circuitry 1172 and baseband processing circuitry 1174 may be on separate chips (or sets of chips), boards, or units, such as radio units and digital units. In alternative aspects, part or all of RF transceiver circuitry 1172 and baseband processing circuitry 1174 may be on the same chip or set of chips, boards, or units In certain aspects, some or all of the functionality described herein as being provided by a network node, base station, eNB or other such network device may be performed by processing circuitry 1170 executing instructions stored on device readable medium 1180 or memory within processing circuitry 1170. In alternative aspects, some or all of the functionality may be provided by processing circuitry 1170 without executing instructions stored on a separate or discrete device readable medium, such as in a hard-wired manner. In any of those aspects, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some aspects, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain aspects a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other aspects, the interface may comprise different components and/or different combinations of components.

In certain alternative aspects, network node 1160 may not include separate radio front end circuitry 1192, instead, processing circuitry 1170 may comprise radio front end circuitry and may be connected to antenna 1162 without separate radio front end circuitry 1192. Similarly, in some aspects, all or some of RF transceiver circuitry 1172 may be considered a part of interface 1190. In still other aspects, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some aspects, antenna 1162 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain aspects, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative aspects of network node 1160 may include additional components beyond those shown in FIG. 9 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some aspects, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative aspects, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some aspects, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some aspects, WD 1110 may not include separate radio front end circuitry 1112; rather, processing circuitry 1120 may comprise radio front end circuitry and may be connected to antenna 1111. Similarly, in some aspects, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other aspects, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other aspects, the processing circuitry may comprise different components and/or different combinations of components. In certain aspects processing circuitry 1120 of WD 1110 may comprise a SOC. In some aspects, RF transceiver circuitry 1122, baseband processing circuitry 1124, and application processing circuitry 1126 may be on separate chips or sets of chips. In alternative aspects, part or all of baseband processing circuitry 1124 and application processing circuitry 1126 may be combined into one chip or set of chips, and RF transceiver circuitry 1122 may be on a separate chip or set of chips. In still alternative aspects, part or all of RF transceiver circuitry 1122 and baseband processing circuitry 1124 may be on the same chip or set of chips, and application processing circuitry 1126 may be on a separate chip or set of chips. In yet other alternative aspects, part or all of RF transceiver circuitry 1122, baseband processing circuitry 1124, and application processing circuitry 1126 may be combined in the same chip or set of chips. In some aspects, RF transceiver circuitry 1122 may be a part of interface 1114. RF transceiver circuitry 1122 may condition RF signals for processing circuitry 1120.

In certain aspects, some or all of the functionality described herein as being performed by a WD may be provided by processing circuitry 1120 executing instructions stored on device readable medium 1130, which in certain aspects may be a computer-readable storage medium. In alternative aspects, some or all of the functionality may be provided by processing circuitry 1120 without executing instructions stored on a separate or discrete device readable storage medium, such as in a hard-wired manner. In any of those particular aspects, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some aspects, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the aspect and/or scenario.

Power source 1136 may, in some aspects, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain aspects comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain aspects be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 10:
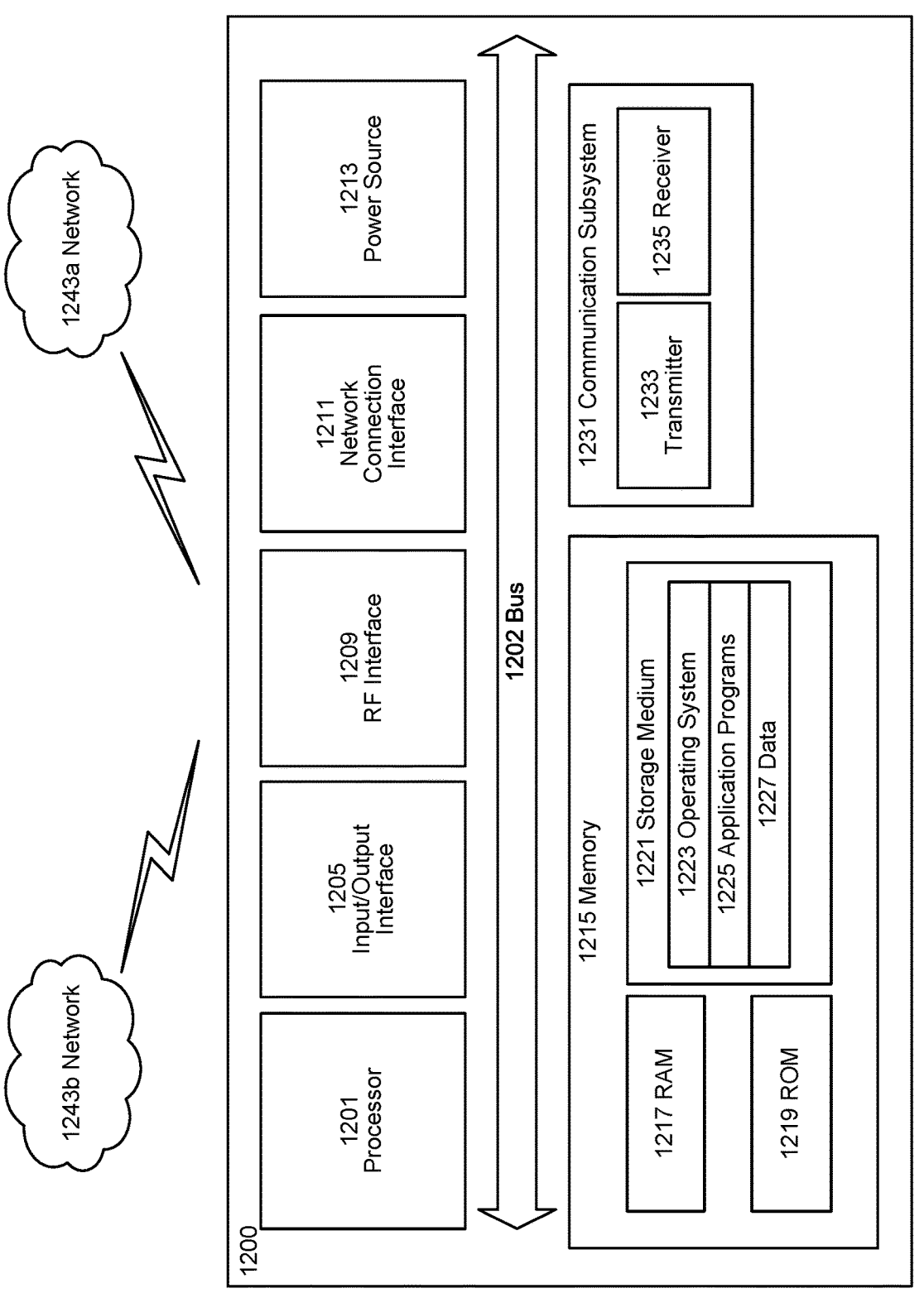
FIG. 10 is block diagram of a UE.

FIG. 10 illustrates one aspect of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem

1231, power source 1233, and/or any other component, or any combination thereof. Storage medium 1221 includes operating system 1223, application program 1225, and data 1227. In other aspects, storage medium 1221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted aspect, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 10, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated aspect, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 11:
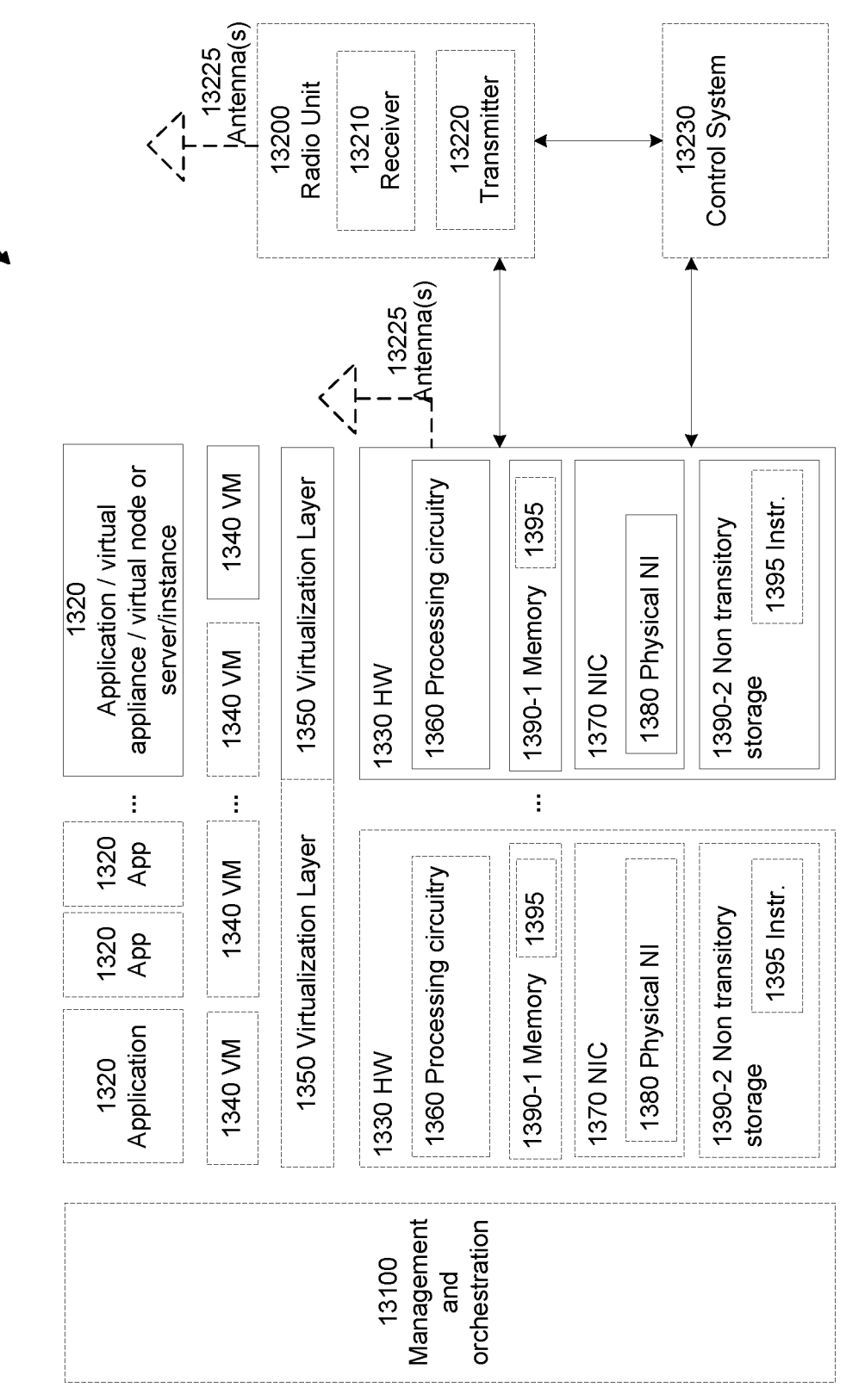
FIG. 11 block diagram of a virtualization environment.

FIG. 11 is a schematic block diagram illustrating a virtualization environment 1300 in which functions implemented by some aspects may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some aspects, some or all of the functions described herein may be implemented as virtual components executed by one or more virtual machines implemented in one or more virtual environments 1300 hosted by one or more hardware nodes 1330. Further, in aspects in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the aspects disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some aspects described herein.

Virtual machines 1340, comprise virtual processing, virtual memory, virtual networking or interface and virtual storage, and may be run by a corresponding virtualization layer 1350 or hypervisor. Different aspects of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 11, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 11.

In some aspects, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some aspects, some signalling can be effected with the use of control system 13230 which may alternatively be used for communication between the hardware nodes 1330 and radio units 13200.

Figure 12:
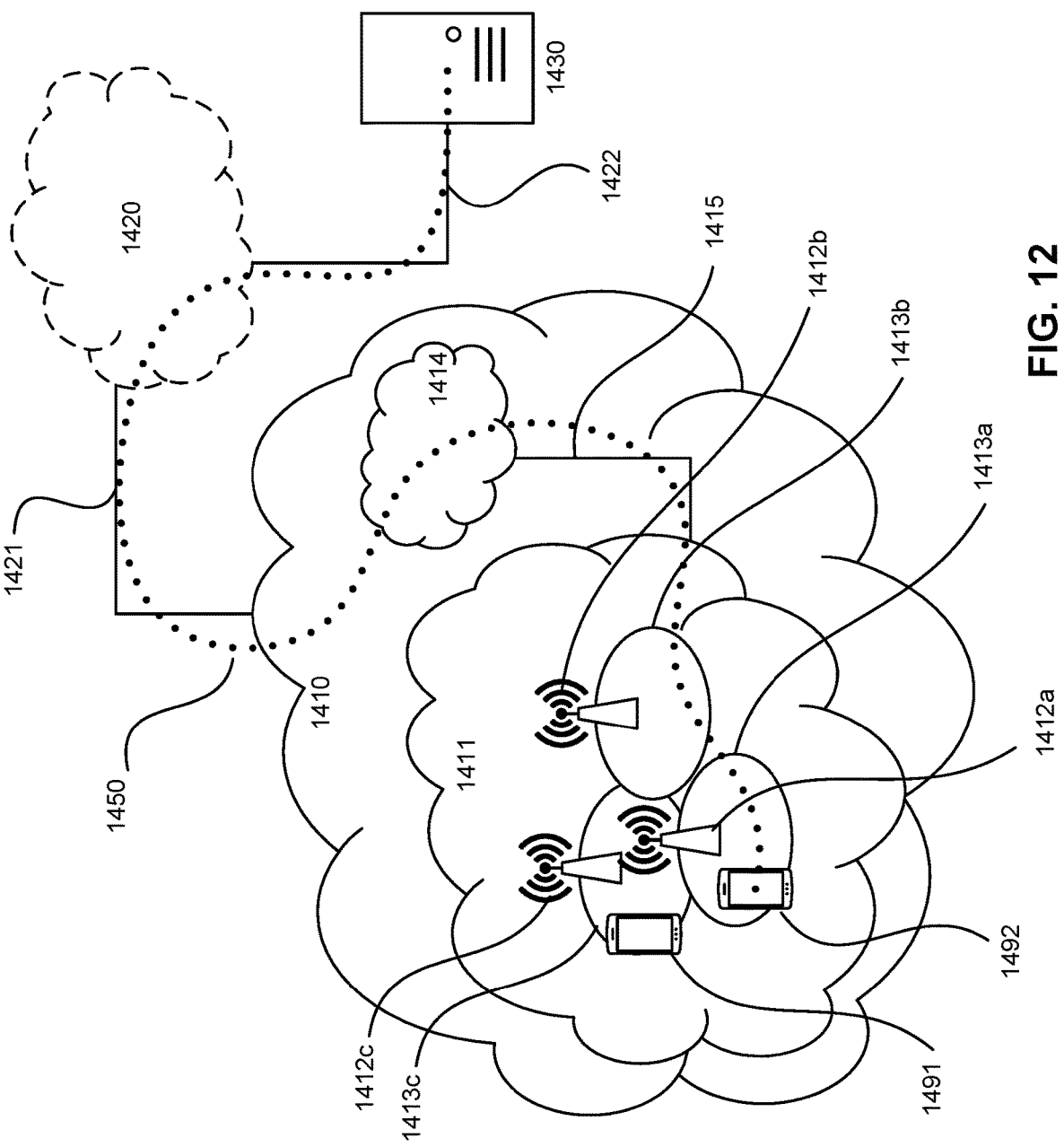
FIG. 12 is a diagram of a telecommunication network connected via an intermediate network to a host computer.

FIG. 12 illustrates a telecommunication network connected via an intermediate network to a host computer in accordance with some aspects. In particular, with reference to FIG. 12, in accordance with an aspect, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed aspects are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 12 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 13:
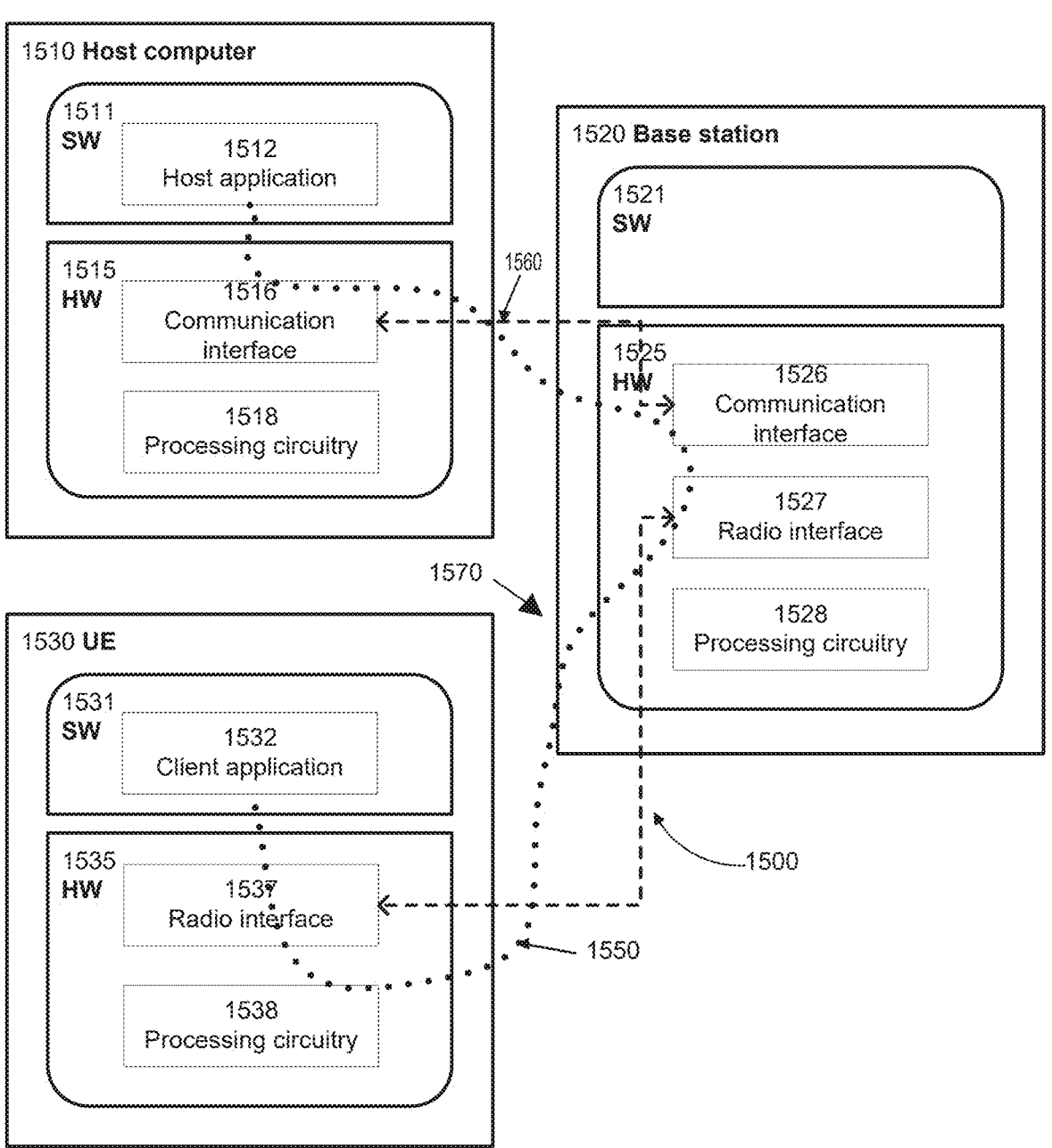
FIG. 13 is a diagram showing communications between a host computer, base station, and UE.

Example implementations, in accordance with an aspect, of the UE, base station and host computer discussed in the preceding paragraphs will now be described with reference to FIG. 13. FIG. 13 illustrates host computer communicating via a base station with a user equipment over a partially wireless connection in accordance with some aspects In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 13) served by base station 1520. Communication interface 1526 may be configured to facilitate connection 1560 to host computer 1510. Connection 1560 may be direct or it may pass through a core network (not shown in FIG. 13) of the telecommunication system and/or through one or more intermediate networks outside the telecommunication system. In the aspect shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 13 may be similar or identical to host computer 1430, one of base stations 1412*a*, 1412*b*, 1412*c* and one of UEs 1491, 1492 of FIG. 12, respectively. This is to say, the inner workings of these entities may be as shown in FIG. 13 and independently, the surrounding network topology may be that of FIG. 12.

In FIG. 13, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the aspects described throughout this disclosure. One or more of the various aspects improve the performance of OTT services provided to UE 1530 using OTT connection 1550, in which wireless connection 1570 forms the last segment. More precisely, the teachings of these aspects may improve packet delivery, and hence meet service level requirements in a TSC QoS flow, and thereby provide benefits such as reducing latency, meeting critical timing requirements, and improving UE battery savings.

A measurement procedure may be provided for the purpose of monitoring data rate, latency and other factors on which the one or more aspects improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In aspects, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain aspects, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 14:
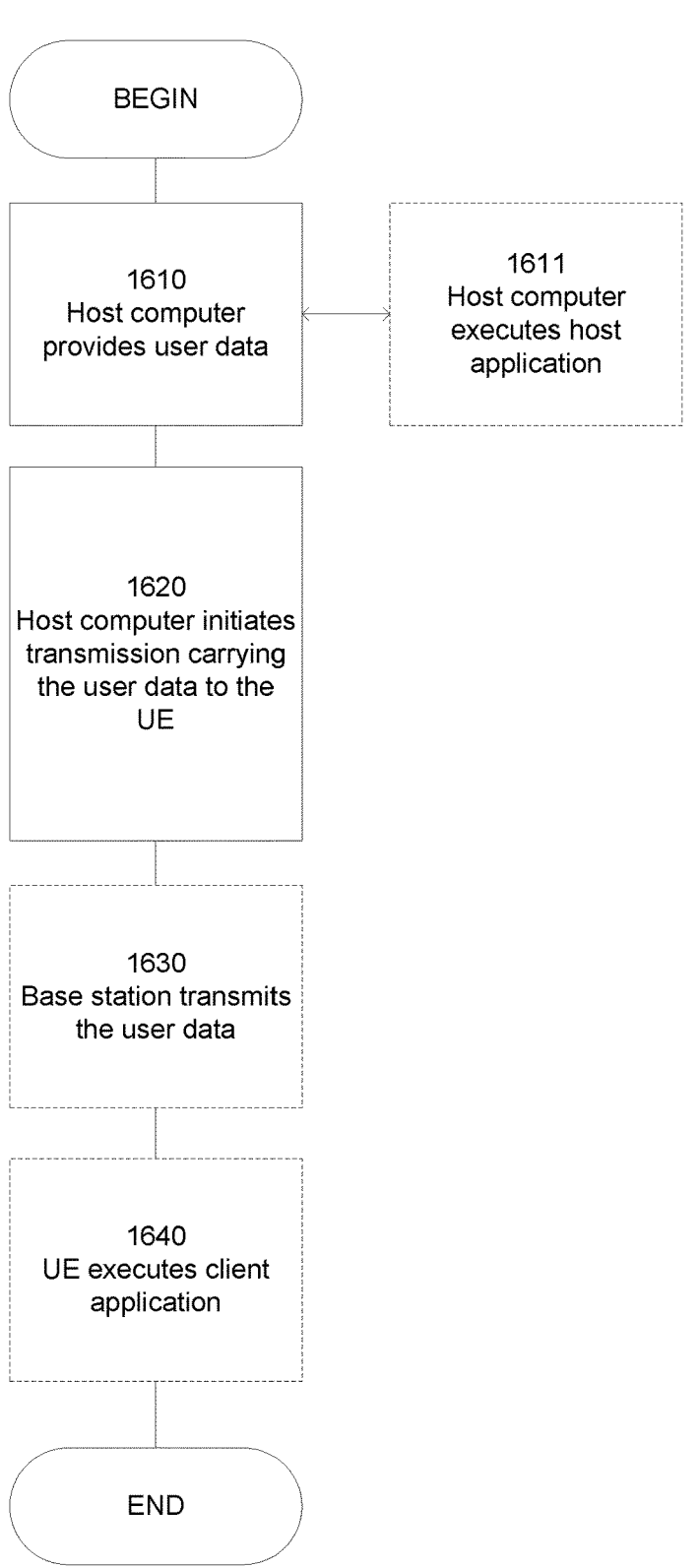
FIG. 14 is a flow diagram of a method of a host computer transmitting user data to a UE.

FIG. 14 is a flowchart illustrating a method implemented in a communication system, in accordance with one aspect. The communication system includes a host computer, a base station and a UE which may be those described with reference to FIGS. 12 and 13. For simplicity of the present disclosure, only drawing references to FIG. 14 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the aspects described throughout this disclosure. In step 1640 (which may also be optional), the UE executes a client application associated with the host application executed by the host computer.

Figure 15:
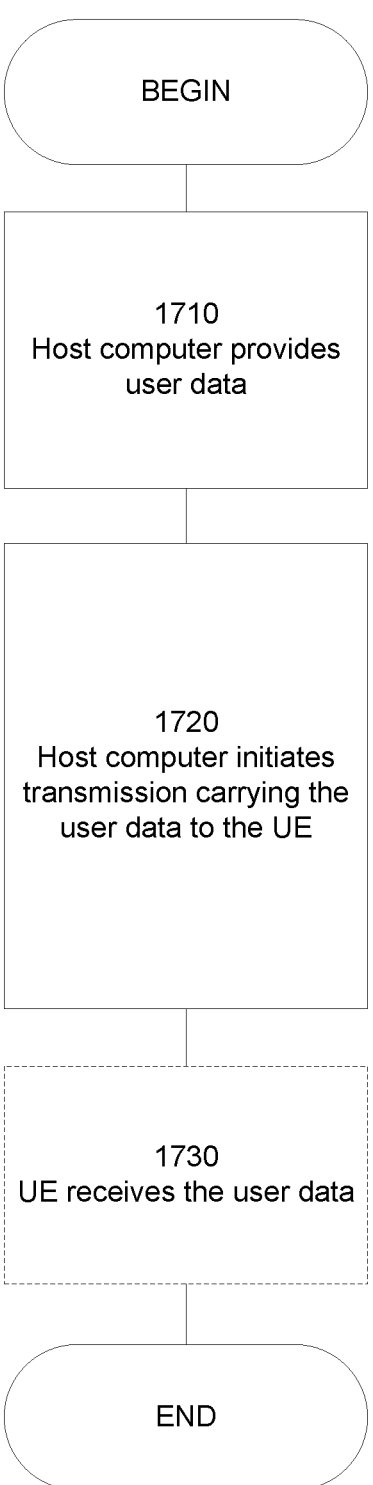
FIG. 15 is a flow diagram of another method of a host computer transmitting user data to a UE.

FIG. 15 is a flowchart illustrating a method implemented in a communication system, in accordance with one aspect. The communication system includes a host computer, a base station and a UE which may be those described with reference to FIGS. 12 and 13. For simplicity of the present disclosure, only drawing references to FIG. 15 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the aspects described throughout this disclosure. In step 1730 (which may be optional), the UE receives the user data carried in the transmission.

Figure 16:
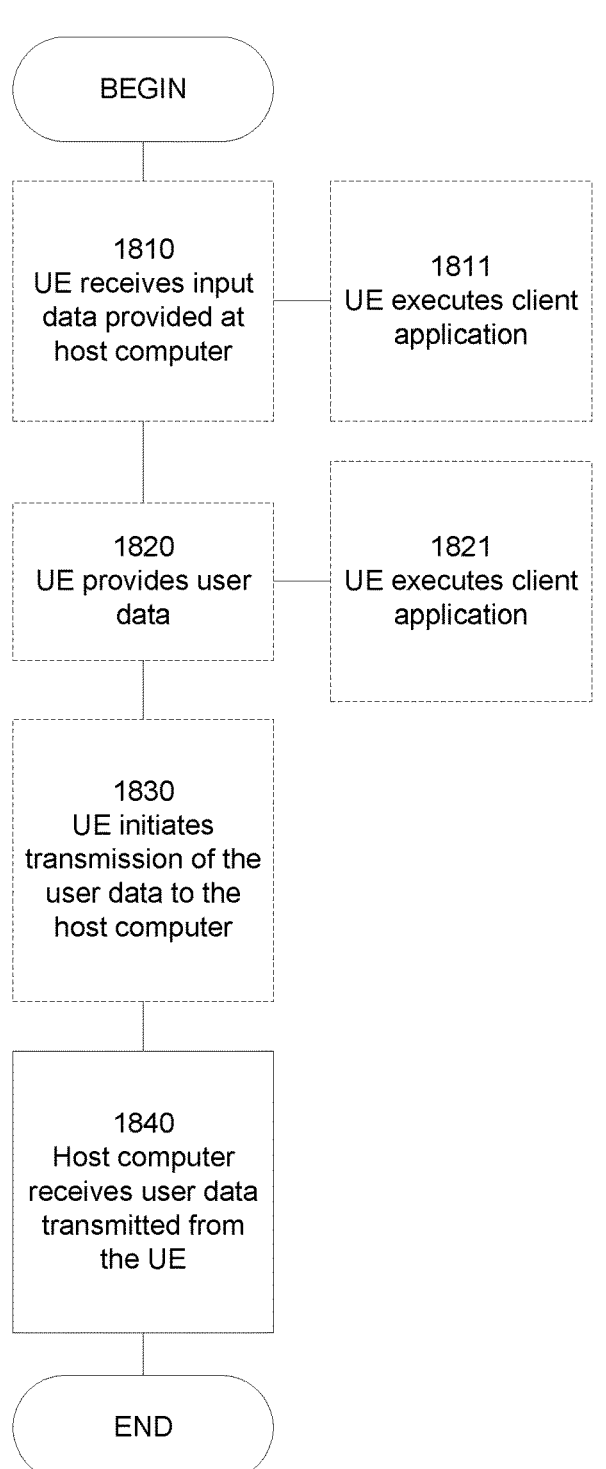
FIG. 16 is a flow diagram of a method of a host computer receiving user data from a UE.

FIG. 16 is a flowchart illustrating a method implemented in a communication system, in accordance with one aspect. The communication system includes a host computer, a base station and a UE which may be those described with reference to FIGS. 12 and 13. For simplicity of the present disclosure, only drawing references to FIG. 16 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the aspects described throughout this disclosure.

Figure 17:
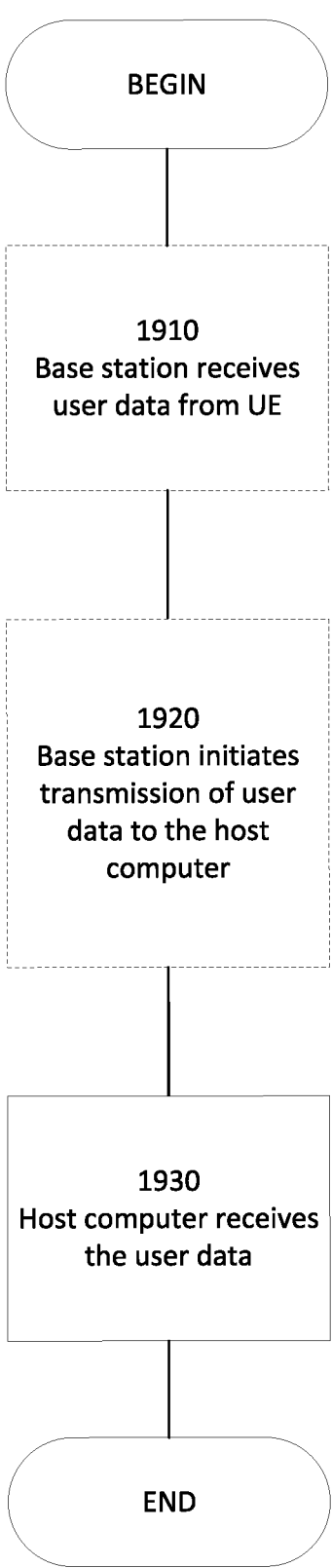
FIG. 17 is a flow diagram of another method of a host computer receiving user data from a UE.

FIG. 17 is a flowchart illustrating a method implemented in a communication system, in accordance with one aspect. The communication system includes a host computer, a base station and a UE which may be those described with reference to FIGS. 12 and 13. For simplicity of the present disclosure, only drawing references to FIG. 17 will be included in this section. In step 1910 (which may be optional), in accordance with the teachings of the aspects described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more aspects of the present disclosure.

Certain aspects may provide one or more of the following technical advantages. The network can utilize survival time to increase the spectral efficiency, while ensuring it meets the service level requirement, in particular for the case where the survival time is very short, e.g., 0.5 millisecond. For example, the network can effectively activate the actual utilization of a PDCP duplication by a DCI command, which is faster and more reliable than the traditional MAC CE activation command. Alternatively, the network can pre-allocate a smaller set of resources needed for PDCP duplication.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the aspects disclosed herein may be applied to any other aspect, wherever appropriate. Likewise, any advantage of any of the aspects may apply to any other aspects, and vice versa. Other objectives, features, and advantages of the enclosed aspects will be apparent from the description.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, such as those that are described herein. As used herein, the term "configured to" means set up, organized, adapted, or arranged to operate in a particular way; the term is synonymous with "designed to." As used herein, the term "substantially" means nearly or essentially, but not necessarily completely; the term encompasses and accounts for mechanical or component value tolerances, measurement error, random variation, and similar sources of imprecision.

Some of the aspects contemplated herein are described more fully with reference to the accompanying drawings. Other aspects, however, are contained within the scope of the subject matter disclosed herein. The disclosed subject matter should not be construed as limited to only the aspects set forth herein; rather, these aspects are provided by way of example to convey the scope of the subject matter to those skilled in the art.

The present disclosure may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

EMBODIMENTS

Group A Embodiments

1. A method (100), performed by a wireless device (10, 30) operative in a wireless communication network, for transmitting uplink data packets in a data flow implementing Packet Data Convergence Protocol, PDCP, packet duplication, the method (100) characterized by:
   operating (102) a first Radio Link Control, RLC, entity as a first PDCP duplication leg;
   operating (104) a second RLC entity as a second PDCP duplication leg;
   upon the actual or estimated arrival (104) of each data packet in the first PDCP duplication leg, starting (106) a discard timer having a duration less than an estimated arrival time of a subsequent data packet;
   in response to the unavailability of radio resources (108) associated with the first PDCP duplication leg, discarding (112) each data packet, without transmitting it, at the expiration of the discard timer (110); and
   in response to the network allocating radio resources (108) associated with the first PDCP duplication leg, transmitting (114) data packets to the network utilizing the allocated radio resources.

2. The method (100) of embodiment 1, wherein the data flow has a Quality of Service, QoS, restriction associated with it.

3. The method (100) of embodiment 2, wherein the QoS data flow is a Time Sensitive Communication, TSC, data flow.

4. The method (100) of embodiment 1 wherein the discard timer is started (106) upon the actual arrival of each data packet at the PDCP or RLC layer.

5. The method (100) of embodiment 3 wherein the discard timer is started (106) according to the Burst Arrival Time, BAT, parameter in a TSC Assistance Information, TSCAI.

6. The method (100) of embodiment 1 wherein the discard timer is started (106) when the PDCP or RLC packet is delivered to a lower layer for transmission.

7. The method (100) of any of embodiments 3-6 wherein the arrival time of a subsequent data packet is estimated from packet periodicity in a TSC Assistance Information, TSCAI.

8. The method (100) of any of embodiments 2-7 wherein the discard timer duration is at least a Packet Delay Budget, PDB, for the QoS flow.

9. The method (100) of any preceding embodiment wherein a logical channel of the first PDCP duplication leg is configured with a Logical Channel Priority restriction such that the radio resources associated with the first PDCP duplication leg are not available unless explicitly activated by the network.

10. The method (100) of embodiment 9 wherein the radio resources that are not available unless explicitly activated by the network comprise configured but not activated Configured Grants, CG.

11. The method (100) of embodiment 9 wherein the radio resources that are not available unless explicitly activated by the network comprise dynamic grants with a specific PHY layer index.

12. The method (100) of any of embodiments 1-8 wherein a logical channel of the first PDCP duplication leg is configured with a Logical Channel Priority restriction such that the radio resources associated with the first PDCP duplication leg are only available every N-th instance of the periodic traffic.

13. The method (100) of embodiment 12 wherein the radio resources that are only available every N-th instance comprise Configured Grants, CG, that are configured but only activated every N-th instance.

14. The method (100) of embodiment 12 wherein the radio resources that are that are only available every N-th instance comprise dynamic grants with a specific PHY layer index that are only issued every N-th instance.

15. The method (100) of any preceding embodiment wherein the network enters a survival time upon first detecting a packet was not received on a configured and activated radio resource.

16. The method (100) of embodiment 15 wherein the network exits a survival time upon receiving a packet prior to expiration of the survival time.

17. The method (100) of any preceding embodiment wherein the network allocates radio resources associated with the first PDCP duplication leg in response to a survival time by transmitting a Downlink Control Information, DCI, command to the wireless device.

AA. The method of any of the previous embodiments, further comprising:
providing user data; and
forwarding the user data to a host computer via the transmission to the base station.

Group B Embodiments

18. A method (200), performed by a base station (50, 70) operative in a wireless communication network, for controlling the transmission of uplink data packets in a data flow implementing Packet Data Convergence Protocol, PDCP, packet duplication, the method (200) characterized by:
configuring (202) a first Radio Link Control, RLC, entity as a first PDCP duplication leg in a wireless device (10, 30) operative in the wireless communication network;
configuring (204) a second RLC entity as a second PDCP duplication leg in the wireless device;
configuring (204) a discard timer in the wireless device (10, 30) to be started upon the actual or estimated arrival of each data packet in the first PDCP duplication leg, the discard timer having a duration less than an estimated arrival time of a subsequent data packet;
in response to timely receiving data packets (206) from the second PDCP duplication leg, not allocating radio resources (210) associated with the first PDCP duplication leg; and
in response to failing to timely receive a data packet from the second PDCP duplication leg (206), allocating (208) radio resources associated with the first PDCP duplication leg, and receiving data packets from the first PDCP duplication leg.

19. The method (200) of embodiment 18, wherein the data flow has a Quality of Service, QoS, restriction associated with it.

20. The method (200) of embodiment 19, wherein the QoS data flow is a Time Sensitive Communication, TSC, data flow.

21. The method (200) of embodiment 18 wherein the wireless device (10, 30) is configured to start the discard timer upon the actual arrival of each data packet at the PDCP or RLC layer.

22. The method (200) of embodiment 20 wherein the wireless device (10, 30) is configured to start the discard timer in alignment with a Burst Arrival Time, BAT, parameter in a TSC Assistance Information, TSCAI.

23. The method (200) of embodiment 18 wherein the wireless device (10, 30) is configured to start the discard timer when the PDCP or RLC packet is delivered to a lower layer for transmission.

24. The method (200) of any of embodiments 20-24 wherein the arrival time of a subsequent data packet is estimated from packet periodicity in a TSC Assistance Information, TSCAI.

25. The method (200) of any of embodiments 19-24 wherein the discard timer duration is at least a Packet Delay Budget, PDB, for the QoS flow.

26. The method (200) of any of embodiments 18-25 wherein allocating or not allocating radio resources associated with the first PDCP duplication leg comprises configuring a logical channel of the PDCP duplication leg with a Logical Channel Priority, LCP, restriction such that the radio resources associated with the first PDCP duplication leg are not available unless explicitly activated.

27. The method (200) of embodiment 26 wherein the radio resources that are not available unless explicitly activated comprise configured but not activated Configured Grants, CG.

28. The method (200) of embodiment 26 wherein the radio resources that are not available unless explicitly activated comprise dynamic grants with a specific PHY layer index.

29. The method (200) of any of embodiments 18-28 wherein the base station (50, 70) enters a survival time upon first detecting a packet was not received on a configured and activated radio resource.

30. The method (200) of embodiment 29 wherein the base station (50, 70) exits a survival time upon receiving a packet prior to expiration of the survival time.

31. The method (200) of any of embodiments 18-30 wherein the base station (50, 70) allocates radio resources associated with the first PDCP duplication leg in response to a survival time by transmitting a Downlink Control Information, DCI, command to the wireless device (10, 30).

BB. The method of any of the previous embodiments, further comprising:
obtaining user data; and
forwarding the user data to a host computer or a wireless device.

Group C Embodiments

C1. A wireless device configured to perform any of the steps of any of the Group A embodiments.

C2. A wireless device comprising:
processing circuitry configured to perform any of the steps of any of the Group A embodiments; and
power supply circuitry configured to supply power to the wireless device.

C3. A wireless device comprising:
processing circuitry and memory, the memory containing instructions executable by the processing circuitry whereby the wireless device is configured to perform any of the steps of any of the Group A embodiments.

C4. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C5. A computer program comprising instructions which, when executed by at least one processor of a wireless device, causes the wireless device to carry out the steps of any of the Group A embodiments.

C6. A carrier containing the computer program of embodiment C5, wherein the carrier is one of an electronic signal, optical signal, radio signal, or computer readable storage medium.

C7. A base station configured to perform any of the steps of any of the Group B embodiments.

C8. A base station comprising:
processing circuitry configured to perform any of the steps of any of the Group B embodiments;
power supply circuitry configured to supply power to the base station.

34

C9. A base station comprising:
processing circuitry and memory, the memory containing instructions executable by the processing circuitry whereby the base station is configured to perform any of the steps of any of the Group B embodiments.

C10. A computer program comprising instructions which, when executed by at least one processor of a base station, causes the base station to carry out the steps of any of the Group B embodiments.

C11. A carrier containing the computer program of embodiment C10, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:

the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:

at the UE, executing a client application, thereby providing the user data to be transmitted; and at the host computer, executing a host application associated with the client application.

D22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method, performed by a wireless device operative in a wireless communication network, for transmitting uplink data packets in a data flow implementing Packet Data Convergence Protocol (PDCP) packet duplication, the method characterized by:

operating a first Radio Link Control (RLC) entity as a first PDCP duplication leg;

operating a second RLC entity as a second PDCP duplication leg;

upon the actual or estimated arrival of each data packet in the first PDCP duplication leg, starting a discard timer having a duration less than an estimated arrival time of a subsequent data packet;

in response to the unavailability of radio resources associated with the first PDCP duplication leg, discarding each data packet, without transmitting it, at the expiration of the discard timer; and in response to the network allocating radio resources associated with the first PDCP duplication leg, transmitting data packets to the network utilizing the allocated radio resources.

2. The method of claim 1, wherein the data flow has a Quality of Service (QoS) restriction associated with it, optionally wherein the QoS data flow is a Time Sensitive Communication (TSC) data flow, further optionally, the discard timer duration is at least a Packet Delay Budget (PDB) for the QoS flow.

3. The method of claim 1 wherein the discard timer is started upon one of: the actual arrival of each data packet at the PDCP or RLC layer, according to the Burst Arrival Time (BAT) parameter in a TSC Assistance Information (TSCAI), and when the PDCP or RLC packet is delivered to a lower layer for transmission.

4. The method of claim 1 wherein a logical channel of the first PDCP duplication leg is configured with a Logical Channel Priority restriction such that the radio resources associated with the first PDCP duplication leg are:

not available unless explicitly activated by the network, further wherein the radio resources that are not available unless explicitly activated by the network comprise: configured but not activated Configured Grants (CG), or dynamic grants with a specific PHY layer index; or only available every N-th instance of the periodic traffic, further wherein the radio resources that are only available every N-th instance comprise: Configured Grants (CG) that are configured but only activated every N-th instance; or dynamic grants with a specific PHY layer index that are only issued every N-th instance, further optionally, wherein the network allocates radio resources associated with the first PDCP duplication leg in response to a survival time by transmitting a Downlink Control Information (DCI) command to the wireless device.

5. The method of claim 1 wherein the network enters a survival time upon first detecting a packet was not received on a configured and activated radio resource, further wherein the network exits a survival time upon receiving a packet prior to expiration of the survival time.

6. A method, performed by a base station operative in a wireless communication network, for controlling the transmission of uplink data packets in a data flow implementing Packet Data Convergence Protocol (PDCP) packet duplication, the method characterized by:

configuring a first Radio Link Control (RLC) entity as a first PDCP duplication leg in a wireless device operative in the wireless communication network;

configuring a second RLC entity as a second PDCP duplication leg in the wireless device;

configuring a discard timer in the wireless device to be started upon the actual or estimated arrival of each data packet in the first PDCP duplication leg, the discard timer having a duration less than an estimated arrival time of a subsequent data packet;

in response to timely receiving data packets from the second PDCP duplication leg, not allocating radio resources associated with the first PDCP duplication leg; and in response to failing to timely receive a data packet from the second PDCP duplication leg, allocating radio resources associated with the first PDCP duplication leg, and receiving data packets from the first PDCP duplication leg.

7. The method of claim 6, wherein the data flow has a Quality of Service (QoS) restriction associated with it, optionally wherein the QoS data flow is a Time Sensitive Communication (TSC) data flow, further optionally, the discard timer duration is at least a Packet Delay Budget (PDB) for the QoS flow.

8. The method of claim 6, wherein the wireless device is configured to start the discard timer upon one of: the actual arrival of each data packet at the PDCP or RLC layer, in alignment with a Burst Arrival Time (BAT) parameter in a TSC Assistance Information (TSCAI), and when the PDCP or RLC packet is delivered to a lower layer for transmission.

9. The method of claim 6, wherein allocating or not allocating radio resources associated with the first PDCP duplication leg comprises configuring a logical channel of the PDCP duplication leg with a Logical Channel Priority (LCP) restriction such that the radio resources associated with the first PDCP duplication leg are not available unless explicitly activated, further wherein the radio resources that are not available unless explicitly activated comprise on of configured but not activated Configured Grants (CG) and dynamic grants with a specific PHY layer index, further optionally, wherein the base station allocates radio resources associated with the first PDCP duplication leg in response to a survival time by transmitting a Downlink Control Information (DCI) command to the wireless device.

10. The method of claim 6, wherein the base station enters a survival time upon first detecting a packet was not received on a configured and activated radio resource, further wherein the base station exits a survival time upon receiving a packet prior to expiration of the survival time.

11. A User Equipment (UE) operative in a wireless communication network to transmit uplink data packets in a data flow implementing Packet Data Convergence Protocol (PDCP) packet duplication, the UE characterized by:

communication circuitry configured to wirelessly transmit and receive signals; and processing circuitry operatively connected to the communication circuitry and configured to operate a first Radio Link Control (RLC) entity as a first PDCP duplication leg;

operate a second RLC entity as a second PDCP duplication leg;

upon the actual or estimated arrival of each data packet in the first PDCP duplication leg, start a discard timer having a duration less than an estimated arrival time of a subsequent data packet;

in response to the unavailability of radio resources associated with the first PDCP duplication leg, discarding each packet, without transmitting it, at the expiration of the discard timer; and in response to the network allocating radio resources associated with the first PDCP duplication leg, transmit data packets to the network utilizing the allocated radio resources.

12. The UE of claim 11, wherein the data flow has a Quality of Service (QoS) restriction associated with it, optionally wherein the QoS data flow is a Time Sensitive Communication (TSC) data flow, further optionally, the discard timer duration is at least a Packet Delay Budget (PDB) for the QoS flow.

13. The UE of claim 11 wherein the processing circuitry is configured to start the discard timer upon one of the actual arrival of each data packet at the PDCP or RLC layer, with the Burst Arrival Time (BAT) parameter in a TSC Assistance Information (TSCAI), and when the PDCP or RLC packet is delivered to a lower layer for transmission.

14. The UE of claim 11 wherein the processing circuitry is configured to configure a logical channel of the first PDCP duplication leg with a Logical Channel Priority restriction such that the radio resources associated with the first PDCP duplication leg are either:

not available unless explicitly activated by the network, further wherein the radio resources that are not available unless explicitly activated by the network comprise: configured but not activated Configured Grants (CG) or dynamic grants with a specific PHY layer index; or only available every N-th instance of the periodic traffic, further wherein the radio resources that are only available every N-th instance comprise: Configured Grants (CG) that are configured but only activated every N-th instance or dynamic grants with a specific PHY layer index that are only issued every N-th instance.

15. A base station, operative in a wireless communication network to control the transmission of uplink data packets in a data flow implementing Packet Data Convergence Protocol (PDCP) packet duplication, the base station characterized by:

communication circuitry configured to wirelessly transmit and receive signals; and processing circuitry operatively connected to the communication circuitry and configured to configure a first Radio Link Control (RLC) entity as a first PDCP duplication leg in a wireless device operative in the wireless communication network;

configure a second RLC entity as a second PDCP duplication leg the wireless device;

configure a discard timer in the wireless device to be started upon the actual or estimated arrival of each data packet in the first PDCP duplication leg, the discard timer having a duration less than an estimated arrival time of a subsequent data packet;

in response to timely receiving data packets from the second PDCP duplication leg, not allocate radio resources associated with the first PDCP duplication leg; and in response to failing to timely receive a data packet from the second PDCP duplication leg, allocate radio resources associated with the first PDCP duplication leg, and receive data packets from the first PDCP duplication leg.

16. The base station of claim 15, wherein the data flow has a Quality of Service (QoS) restriction associated with it, optionally wherein the QoS data flow is a Time Sensitive Communication (TSC) data flow, further optionally, the discard timer duration is at least a Packet Delay Budget (PDB) for the QoS flow.

17. The base station of claim 15 wherein the processing circuitry is configured to configure the wireless device to start the discard timer upon one of the actual arrival of each data packet at the PDCP or RLC layer, in alignment with a Burst Arrival Time (BAT) parameter in a TSC Assistance Information (TSCAI), and when the PDCP or RLC packet is delivered to a lower layer for transmission.

18. The base station of claim 15 wherein the processing circuitry is configured to allocate or not allocate radio resources associated with the first PDCP duplication leg by configuring a logical channel of the first PDCP duplication leg with a Logical Channel Priority (LCP) restriction such that the radio resources associated with the first PDCP duplication leg are not available unless explicitly activated, further wherein the radio resources that are not available unless explicitly activated comprise configured but not activated Configured Grants (CG) or dynamic grants with a specific PHY layer index.

19. The base station of claim 15 wherein the processing circuitry is configured to allocate or not allocate radio resources associated with the first PDCP duplication leg by configuring a logical channel of the first PDCP duplication leg with a Logical Channel Priority (LCP) restriction such that the radio resources associated with the first PDCP duplication leg are only available every N-th instance of the periodic traffic, further wherein the radio resources that are only available every N-th instance comprise either Configured Grants (CG) that are configured but only activated every N-th instance, or dynamic grants with a specific PHY layer index that are only issued every N-th instance, further optionally, wherein the processing circuitry is configured to allocate radio resources associated with the first PDCP duplication leg in response to a survival time by transmitting a Downlink Control Information (DCI) command to the wireless device.

20. The base station of claim 15 wherein the processing circuitry is configured to enter a survival time upon first detecting a packet was not received on a configured and activated radio resource, further wherein the processing circuitry is configured to exit a survival time upon receiving a packet prior to expiration of the survival time.

* * * * *